(12) United States Patent
Sheng et al.

(10) Patent No.: US 12,119,483 B2
(45) Date of Patent: Oct. 15, 2024

(54) NEGATIVE ELECTRODE PLATE, ELECTRODE ASSEMBLY, LITHIUM-ION BATTERY AND PROCESS FOR PREPARATION THEREOF AND APPARATUS CONTAINING LITHIUM-ION BATTERY

(71) Applicant: Contemporary Amperex Technology Co., Limited, Ningde (CN)

(72) Inventors: Changliang Sheng, Ningde (CN); Shiwen Wang, Ningde (CN); Qisen Huang, Ningde (CN); Cheng Li, Ningde (CN); Chengdu Liang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 46 days.

(21) Appl. No.: 17/536,118

(22) Filed: Nov. 29, 2021

(65) Prior Publication Data

US 2022/0085361 A1 Mar. 17, 2022

Related U.S. Application Data

(63) Continuation of application No. PCT/CN2020/090018, filed on May 13, 2020.

(30) Foreign Application Priority Data

May 31, 2019 (CN) .......................... 201910471884.1

(51) Int. Cl.
*H01M 4/36* (2006.01)
*H01M 4/13* (2010.01)
(Continued)

(52) U.S. Cl.
CPC ............. *H01M 4/366* (2013.01); *H01M 4/13* (2013.01); *H01M 4/382* (2013.01); *H01M 4/628* (2013.01);
(Continued)

(58) Field of Classification Search
None
See application file for complete search history.

(56) References Cited

U.S. PATENT DOCUMENTS

2009/0098458 A1* 4/2009 Fujii ...................... H01M 4/02
429/209
2013/0177808 A1* 7/2013 Wang ................ H01M 10/4235
429/231.95
(Continued)

FOREIGN PATENT DOCUMENTS

CN 1508893 A 6/2004
CN 103378347 A 10/2013
(Continued)

OTHER PUBLICATIONS

The First Office Action for Chinese Application No. 201910471884. 1, dated Mar. 26, 2021, 18 pages.
(Continued)

*Primary Examiner* — Yoshitoshi Takeuchi
(74) *Attorney, Agent, or Firm* — East IP P.C.

(57) ABSTRACT

The present application discloses a negative electrode plate, an electrode assembly, a lithium-ion battery and process for the preparation thereof, and apparatus containing lithium-ion battery. The negative electrode plate includes a negative electrode current collector; a negative electrode active material layer disposed on the negative electrode current collector; a binder-free inorganic dielectric layer disposed on one side of the negative electrode active material layer away from the negative electrode current collector, the inorganic
(Continued)

dielectric layer comprising an inorganic dielectric material, and the inorganic dielectric layer including at least a main body portion disposed on the surface of the negative electrode active material layer, the main body portion having a thickness of from 30 nm to 1000 nm; and a lithium metal layer disposed on the surface of the inorganic dielectric layer away from the negative electrode active material layer.

12 Claims, 4 Drawing Sheets

(51) Int. Cl.
  *H01M 4/38* (2006.01)
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2016/0351973 | A1 | 12/2016 | Albano et al. |
| 2017/0194627 | A1* | 7/2017 | Deng .............. H01M 4/386 |
| 2018/0286597 | A1 | 10/2018 | Kawai et al. |
| 2019/0088987 | A1 | 3/2019 | Herle |
| 2019/0280286 | A1 | 9/2019 | Song et al. |

FOREIGN PATENT DOCUMENTS

| | | |
|---|---|---|
| CN | 103943819 A | 7/2014 |
| CN | 105470450 A | 4/2016 |
| CN | 107706421 A | 2/2018 |
| CN | 107799721 A | 3/2018 |
| CN | 108550780 A | 9/2018 |
| CN | 109301353 A | 2/2019 |
| CN | 109616611 A | 4/2019 |
| CN | 109786662 A | 5/2019 |
| CN | 109817953 A | 5/2019 |
| EP | 3588656 A1 | 1/2020 |
| JP | 2004165097 A | 6/2004 |
| JP | 2012174959 A | 9/2012 |
| KR | 1020180134309 A | 12/2018 |
| KR | 20190042336 A | 4/2019 |

OTHER PUBLICATIONS

The International search report for PCT Application No. PCT/CN2020/090018, dated Jul. 30, 2020, 11 pages.
The extended European search report for European Application No. 20814327.1, dated Apr. 26, 2022, 9 pages.
Zhong Ming et al.Research progress on pre-lithiation in carbon-based lithium-ion capacitor.Energy Storage Science and Technology,vol. 7,No. 4,The full text,dated Jul. 31, 2018, 7 pages.
Li Zhao et al.A Comparative Study of Pre-Lithiated Hard Carbon and Soft Carbon as Anodes for Lithium-Ion Capacitors.Journal of Electrochemistry,vol. 25,No. 1, The full text,dated Feb. 28, 2019, 15 pages.
The First Office Action for Chinese Application No. 202110779732. 5, dated Apr. 18, 2022, 21 pages.
The Second Office Action for Chinese Application No. 202110779732. 5, dated Aug. 15, 2022, 18 pages.
The Rejection Decision for Chinese Application No. 202110779732. 5, dated Oct. 8, 2022, 8 pages.
Jee HoYom et al. Optimization of Heat Treatment Conditions for Fabricating Pre-Lithiated Silicon Monoxide as an Anode Material for Lithium-Ion Batteries, Journal of the Electrochemical society,165(3)A603-A608(2018),dated Mar. 6, 2018, 6 pages.

* cited by examiner

NEGATIVE ELECTRODE PLATE, ELECTRODE ASSEMBLY, LITHIUM-ION BATTERY AND PROCESS FOR PREPARATION THEREOF AND APPARATUS CONTAINING LITHIUM-ION BATTERY

CROSS-REFERENCE TO RELATED APPLICATION

This application is a continuation of International Application No. PCT/CN2020/090018, filed on May 13, 2020, which claims priority to Chinese Patent Application No. 201910471884.1 filed on May 31, 2019, both of which are incorporated herein by reference in their entireties.

TECHNICAL FIELD

The present application relates to the technical field of secondary batteries and more particularly, to a negative electrode plate, an electrode assembly, a lithium-ion battery and process for the preparation thereof and an apparatus containing the lithium-ion battery.

BACKGROUND

Lithium-ion batteries, as a kind of batteries, mainly rely on the reciprocating movement of lithium ions between a positive electrode active material and a negative electrode active material for charging and discharging, and electrolyte is usually used as a carrier for lithium-ion transmission. In the process of use, lithium-ion batteries can provide stable voltage and current, and the use process is green and environmentally friendly. Thus, the lithium-ion batteries are widely used in various electronic products and electric vehicles, occupying the mainstream position in the battery field.

However, the service life of the existing lithium-ion batteries is required to be extended urgently to meet people's increasingly higher requirements for battery service life.

SUMMARY

A first aspect of the present application provides a negative electrode plate, comprising a negative electrode current collector; a negative electrode active material layer disposed on the negative electrode current collector; a binder-free inorganic dielectric layer disposed on one side of the negative electrode active material layer away from the negative electrode current collector, the inorganic dielectric layer comprising an inorganic dielectric material, and the inorganic dielectric layer including at least a main body portion disposed on the surface of the negative electrode active material layer, the main body portion having a thickness of from 30 nm to 1000 nm; and a lithium metal layer disposed on the surface of the inorganic dielectric layer away from the negative electrode active material layer.

A second aspect of the present application provides a negative electrode plate, comprising a negative electrode current collector; a negative electrode active material layer disposed on the negative electrode current collector, the negative electrode active material layer comprising a pre-lithiated negative electrode active material; and a binder-free inorganic dielectric layer disposed on one side of the negative electrode active material layer away from the negative electrode current collector, the inorganic dielectric layer comprising an inorganic dielectric material, and the inorganic dielectric layer including at least a main body portion disposed on the surface of the negative electrode active material layer, the main body portion having a thickness of from 30 nm to 1000 nm.

A third aspect of the present application provides an electrode assembly, comprising a negative electrode plate, a positive electrode plate, and a separator, wherein the negative electrode plate is the negative electrode plate as provided by the first aspect and/or the second aspect of the present application.

A fourth aspect of the present application provides an electrode assembly, comprising a negative electrode plate, a positive electrode plate electrode plate and a separator, wherein the negative electrode plate is the negative electrode plate as provided by the first aspect of the present application,
wherein in the negative electrode plate per 2 cm×2 cm unit area, a weight ratio of the lithium metal layer to the negative electrode active material layer is 0.5%~5%; wherein a ratio of a capacity C1 of negative electrode per unit area to a capacity C2 of positive electrode per unit area is 1.2~2.1; and
wherein the capacity C1 of negative electrode per unit area, the capacity C2 of positive electrode per unit area and a capacity C3 of lithium metal layer per unit area satisfy $C1/(C2+C3\times K) \geq 1.05$, where K is a utilization rate of metal lithium in the lithium metal layer.

A fifth aspect of the present application provides a lithium-ion battery, comprising an electrode assembly and an electrolyte, wherein the electrode assembly adopts the electrode assembly as provided by the third aspect or the fourth aspect of the present application. When the electrode assembly of the lithium-ion battery adopts the negative electrode plate as provided by the first aspect of the application, the lithium metal layer therein can spontaneously carry out the intercalation of lithium metal into the negative electrode active material layer under the action of the electrolyte, so that a pre-lithiated negative electrode active material is formed in the negative electrode active material layer.

A sixth aspect of the present application provides an apparatus, comprising the lithium-ion battery provided according to the fifth aspect of the present application.

The seventh aspect of the present application provides a process for preparing a lithium-ion battery, comprising preparing a negative electrode plate of the lithium-ion battery by disposing a negative electrode active material layer on at least one surface of a negative electrode current collector;
depositing an inorganic dielectric material on one side of the negative electrode active material layer away from the negative electrode current collector to form a binder-free inorganic dielectric layer, the inorganic dielectric layer comprising at least a main body portion disposed on the surface of the negative electrode active material layer, the main body portion having a thickness of from 30 nm to 1000 nm; and
disposing a lithium metal layer on the surface of the inorganic dielectric layer away from the negative electrode active material layer to obtain the negative electrode plate.

Compared with the prior art, the present application has at least the following beneficial effects:

In the negative electrode plate provided in the present application, the lithium metal layer is provided, which enables lithium to pre-intercalate into the negative electrode active material to compensate for the consumption of active lithium ions in the lithium-ion battery, thereby improving the initial coulombic efficiency of the battery and improving the cycle life and storage life of the battery. In addition, an inorganic dielectric layer being provided between the negative electrode active material layer and the lithium metal layer serves as a physical isolation, through which the metal lithium of the lithium metal layer diffuses to the negative electrode active material layer for pre-lithiation. At the same time, since the inorganic dielectric layer has dielectric properties, it has the effect of stabilizing the microcurrent at the interface between the lithium metal layer and the negative electrode active material during the pre-lithiation, which can effectively control the pre-lithiation rate of metal lithium into the negative electrode active material layer, and avoid excess of heat generation due to excessively fast pre-lithiation rate, thereby effectively preventing initiation of thermal runaway, improving the cycle life and safety performance of the battery and also preventing decrease of the binding force of the negative active material layer caused by excessively fast volume expansion, or exfoliation of the negative active material film layer, or rupture of the negative active material, and further improving the cycle life of the battery.

BRIEF DESCRIPTION OF DRAWINGS

In order to clearly illustrate technical solutions of embodiments of the present application, drawings used in the embodiments of the present application will be briefly described below, and those skilled in the related art can also obtain other drawing on basis of these drawings without any creative labor. In addition, structural members in the drawings are not necessarily drawn to scale. For example, for other structural members or regions, some structural members or regions in the drawings may be enlarged in size to help the understanding of the embodiments of the present invention.

DESCRIPTION OF EMBODIMENTS

In order to clearly explain the purposes, the technical solutions and the beneficial technical effects of the present application, the present application will be described in detail below with reference to the embodiments. It should be understood that the embodiments described herein are merely used to illustrate the present application, but not intended to limit the present application.

For the sake of brevity, the present application explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. The recitation of "more" in the phrase "one or more" includes two or more.

The above is not intended to describe each disclosed embodiments or implementations. The exemplary embodiments are described in details as below. Throughout the present application, a series of embodiments provide a guidance such that these embodiments can be used in various combinations. In the present application, merely the representative embodiments are presented and should not be construed as to be exhaustive.

Negative Electrode Plate

Figure 1:
FIG. 1 is a structural schematic diagram of a negative electrode plate according to an embodiment of the present application.
Figure 2:
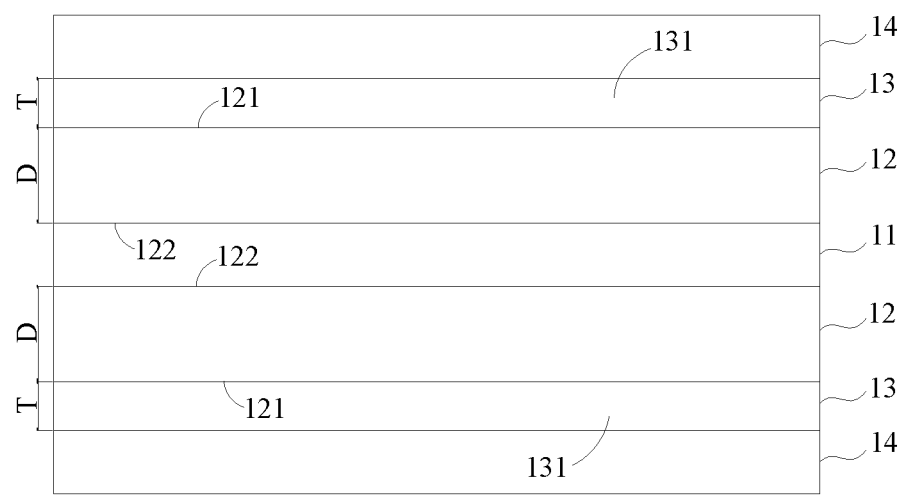
FIG. 2 is a structural schematic diagram of a negative electrode plate according to another embodiment of the present application.

With reference to FIGS. 1 to 2, the present embodiment provides a negative electrode plate 10, comprising a negative electrode current collector 11, a negative electrode active material layer 12, an inorganic dielectric layer 13 and a lithium metal layer 14 which are stacked.

The negative electrode current collector 11 comprises two opposite surfaces along its thickness direction and the negative electrode active material layer 12 can be provided on either one of the two surfaces (as shown in FIG. 1), or can be provided on both surfaces (as shown in FIG. 2). The negative active material layer 12 comprises a first surface 121 and a second surface 122 opposite to each other in the thickness direction thereof, wherein the first surface 121 is disposed away from the negative current collector 11, and the second surface 122 is disposed toward the negative current collector 11. The negative active material layer 12 comprises a negative active material.

The inorganic dielectric layer 13 is disposed on the side of the first surface 121 of the negative active material layer 12. The inorganic dielectric layer 13 comprises at least a main body portion 131 disposed on the first surface 121, and the main body portion 131 has a thickness T of from 30 nm to 1000 nm. The inorganic dielectric layer 13 is a binder-free inorganic dielectric layer, which includes an inorganic dielectric material.

The lithium metal layer 14 is disposed on the surface of the inorganic dielectric layer 13 away from the negative electrode active material layer 12.

It should be noted that the negative electrode plate 10 according to the first aspect of embodiments of the present application is a negative electrode plate that has not been infiltrated by an electrolyte. Through injection of an electrolyte, a potential difference is generated between the negative active material layer 12 and the lithium metal layer 14, which enable lithium of the lithium metal layer 14 to pre-intercalate into the negative electrode active material layer 12 spontaneously so that part or all of metal lithium of the lithium metal layer 14 are pre-intercalated into the negative electrode active material to form a pre-lithiated negative electrode active material.

In the negative electrode plate provided in the present embodiments, the lithium metal layer 14 is provided, which enables lithium to pre-intercalate into the negative electrode active material to compensate for the consumption of active lithium ions in the lithium-ion battery, thereby improving the first Coulombic efficiency of the battery and improving the cycle life and storage life of the battery. Moreover, the inorganic dielectric layer 13 with a predetermined thickness is provided between the negative electrode active material layer 12 and the lithium metal layer 14, which serves as a physical isolation. The metal lithium of the lithium metal layer 14 diffuses through the inorganic dielectric layer 13 to the negative electrode active material layer 12 for pre-lithiation. The inorganic dielectric layer 13 has dielectric properties, so it can have an effect of stabilizing the micro current at the interface of the negative electrode active material and the lithium metal layer 14 during the pre-lithiation process, which can effectively control the pre-lithiation rate of metal lithium into the negative electrode active material layer 12, and avoid excess of heat generation due to excessively fast pre-lithiation rate, thereby effectively preventing initiation of thermal runaway, improving the cycle life and safety performance of the battery and also preventing decrease of the binding force of the negative active material layer 12 caused by excessively fast volume expansion, or exfoliation of the negative active material film layer, or rupture of the negative active material, and further improving the cycle serve life of the battery.

In the negative electrode plate 10 as provided by the present embodiments, the inorganic dielectric layer 13 also functions as stabilizing the negative electrode interface, greatly reducing side reactions of the electrolyte at the negative electrode interface, avoiding side reactions of the electrolyte at the negative electrode interface under high temperature and rapid charging, effectively inhibiting decomposition of the electrolyte to produce gas, reducing heat generation, and reducing consumption of active lithium ions, thereby improving the safety performance, cycle performance and storage performance of the battery, especially the cycle performance and storage performance of the battery at a high temperature, such as a temperature in the range of 40° C.~80° C.

The use of the negative electrode plate 10 according to embodiments of the present application reduces growth of Direct Current internal resistance of the lithium-ion battery during the cycle and storage process, thereby reducing thermal effect, reducing polarization of batteries, and improving cycle performance and rate performance of battery.

In the negative electrode plate 10 according to the embodiments of the present application, the inorganic dielectric material is nano-scale particles, and comprises a large number of polar groups on their surface, which ensures that the inorganic dielectric layer 13 has good electrolyte wettability and can improve the uniformity of the electrolyte distribution at the interface between the inorganic dielectric layer 13 and the lithium metal layer 14 and at the interface between the inorganic dielectric layer 13 and the negative electrode active material layer 12, thereby improving the utilization rate of lithium metal and the pre-lithiation uniformity of the negative electrode plate 10 and further improving the cycle performance of the battery.

The inorganic dielectric layer 13 does not contain a binder, and the inorganic dielectric material particles are not connected by the organic binder molecules, which can ensure the composition, thickness, film cohesion of the inorganic dielectric layer 13, and the binding force between the inorganic dielectric layer 13 and the negative active material layer 12 to have high uniformity, and which can effectively avoid the situation that a portion of inorganic dielectric layer 13 fall off due to the reduction of the adhesion of the inorganic dielectric layer 13 on the surface of the negative active material layer 12 caused by immersion in an electrolytic solution, and which is conducive to improving the intercalation uniformity in the negative electrode active material layer 12 during the pre-lithiation process and the charge and discharge process, thereby improving the cycle life of the battery.

Since the thickness of the inorganic dielectric layer 13 is very small, only at the nanometer level and its effect on the volume and weight of the negative electrode plate 10 is basically negligible, so it can ensure that the lithium-ion battery has a high volume energy density and weight energy density.

In some embodiments, the thickness T of the main body portion 131 of the inorganic dielectric layer 13 may be 1000 nm, 990 nm, 950 nm, 900 nm, 850 nm, 800 nm, 750 nm, 720 nm, 700 nm, 680 nm, 650 nm, 600 nm, 550 nm, 500 nm, 490 nm, 450 nm, 430 nm, 400 nm, 380 nm, 350 nm, 300 nm, 280 nm, 250 nm, 200 nm, 190 nm, 180 nm, 170 nm, 160 nm, 150 nm, 140 nm, 130 nm, 120 nm, 110 nm, 100 nm, 95 nm, 90 nm, 85 nm, 80 nm, 75 nm, 70 nm, 65 nm, 60 nm, 55 nm, 50 nm, 45 nm, 40 nm, 35 nm or 30 nm and the like. For example, the thickness T of the main body portion 131 is in the range of 50 nm to 600 nm, and further, for example, is in the range of 100 nm to 500 nm.

In some embodiments, the main body 131 may be a compact structure composed of particles of inorganic dielectric material, and the micropores between the particles of the inorganic dielectric material may form a channel structure inside the inorganic dielectric layer 13 for the passage of lithium ions. In such embodiments, the coverage ratio δ of the inorganic dielectric layer 13 on the first surface 121 may be $50\% \leq \delta \leq 100\%$, such as 50%, 60%, 65%, 70%, 75%, 80%, 85%, 80%, 95%, 100%, and the like.

In embodiments of the present specification, the above-mentioned coverage ratio δcan be measured by the following test method: the first surface 121 of the negative electrode plate 10 sample is subjected to scanning electron microscope (SEM) test, and the energy disperse spectroscopy (EDS) element analysis method is used to test elements distribution of the inorganic dielectric material on the surface of the negative electrode plate 10, in which the ratio of the element distribution area $S_1$ of the inorganic dielectric material to the area S2 of the first surface 121 of the negative electrode active material layer 12 in SEM spectrum is regarded as the coverage ratio δ of the inorganic dielectric layer 13 on the first surface of the negative electrode active material layer 12.

The inventors have made intensive research and found that, in other embodiments, the main body 131 may further have a channel 132 penetratingly arranged along a thickness direction of the main body portion. That is, the main body portion 131 is provided in a discontinuous state between the negative electrode active material layer 12 and the lithium metal layer 14. In the situation that the pre-lithiation rate of the negative electrode plate 10 is effectively controlled and the negative electrode interface keeps to be stable, the open channel as provided may improve the holding capacity and ion permeability of the negative electrode plate 10 to the electrolyte, and increase the dynamic performance and rate performance of the lithium-ion battery. Moreover, the open channel can further effectively relieve stress of the inorganic dielectric layer 13 when the negative electrode active material layer 12 and the inorganic dielectric layer 13 undergo different volume shrinkage or expansion under conditions such as overcooling or overheating, thereby ensuring that the inorganic dielectric layer 13 and the negative electrode active material layer 12 have a high binding force. In addition, the open channel can also further reduce the weight of the inorganic dielectric layer 13, thereby increasing the volume energy density and weight energy density of the battery.

It can be understood that there is no particular limitation to the shape, number, and arrangement of the channels 132 of the main body portion 131 according to the embodiments of the present application. The channels 132 may be connected or disconnected. Preferably, the channel 132 has a width of 0.05 μm to 6 μm, for example, 0.5 μm to 6 μm, and for example, 3 μm to 6 μm; and further, the channel 132 has an aspect ratio of greater than or equal to 50.

Further, the coverage ratio δ of the inorganic dielectric layer 13 having the above channel 132 on the first surface 121 may be 50%≤δ≤100%, for example, 50%≤δ≤95%, or 60%≤δ≤80%.

Figure 3:
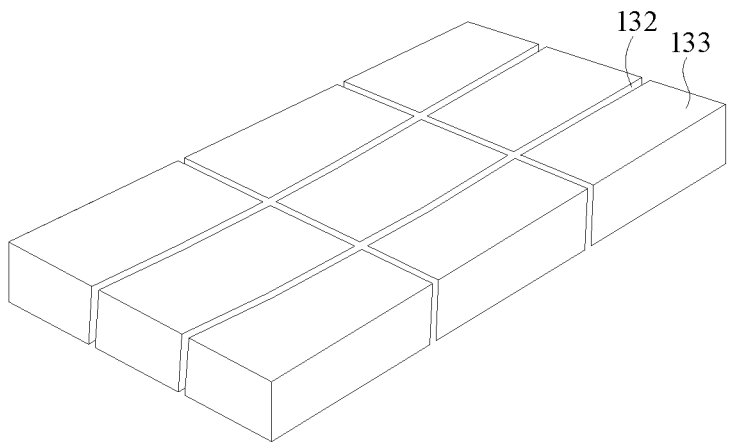
FIG. 3 is a structural schematic diagram of an inorganic dielectric layer in the negative electrode plate according to an embodiment of the present application.

With reference to FIG. 3, as an example, the main body portion 131 may comprises a plurality of inorganic dielectric regions 133, and the plurality of inorganic dielectric regions 133 are independent of each other and spaced apart from each other on the first surface 121 of the negative electrode active material layer 12. The gap among the dielectric regions 133 forms the aforementioned channel 132. In the example, the shape, number, and arrangement of the inorganic dielectric regions 133 are not specifically limited. They can be in the shape of circular, polygonal, and the like, and the gap between two adjacent inorganic dielectric regions 133 is, for example, 0.05 μm~6 μm, or 0.5 μm to 6 μm, or even 3 μm to 6 μm.

Figure 4:
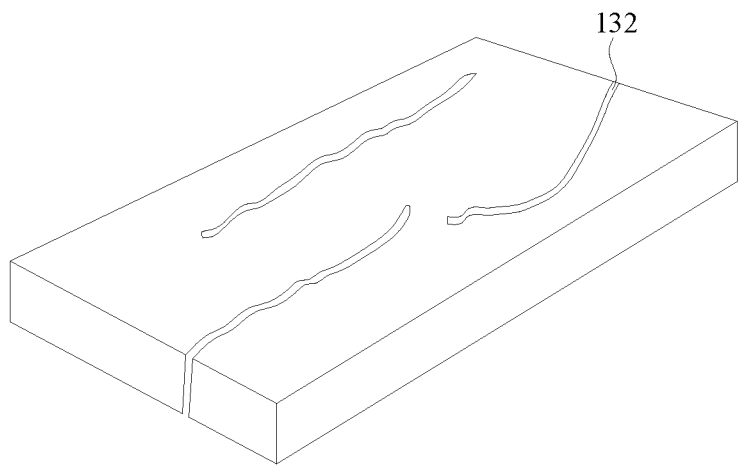
FIG. 4 is a structural schematic diagram of an inorganic dielectric layer in the negative electrode plate according to another embodiment of the present application.

With reference to FIG. 4, as another example, the main body portion 131 is a sheet-shaped body provided on the first surface 121 of the negative active material layer 12, and the sheet-shaped body has an opening penetratingly arranged along the thickness direction of the main body portion. The opening is the aforementioned channel 132. In the example, the shape, number, and arrangement of the opening are not specifically limited. They can be in the shape of circular, polygonal, and the like, such as cracks formed in the main body portion 131. The cracks have a width of for example, 0.05 μm to 6 μm, for example 0.5 μm to 6 μm, or 3 μm to 6 μm. Further, the aspect ratio of the cracks is greater than or equal to 50.

It can be understood that although the cracks in FIG. 4 generally extend along the length direction of the inorganic dielectric layer 13, the cracks on the inorganic dielectric layer 13 may extend along any direction, in other embodiments.

In any of the foregoing embodiments, the size of the inorganic dielectric layer 13 is preferably equal to or substantially equal to the size of the negative electrode active material layer 12. Specifically, the outer peripheral edge of the inorganic dielectric layer 13 and the outer peripheral edge of the negative active material layer 12 are in the same level or substantially in the same level.

Figure 5:
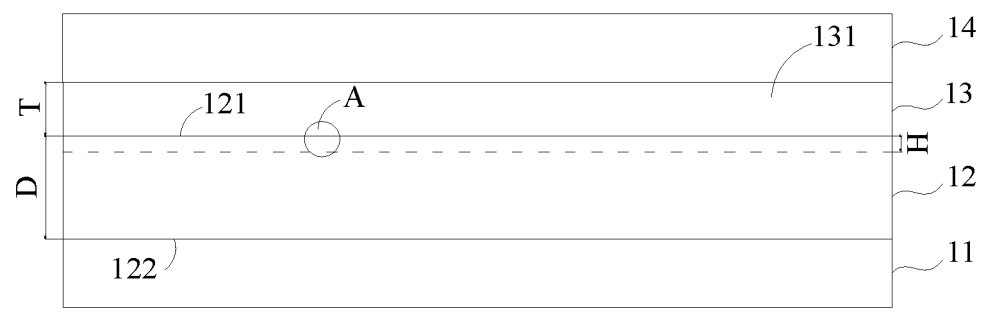
FIG. 5 is a structural schematic diagram of a negative electrode plate according to yet another embodiment of the present application.
Figure 6:
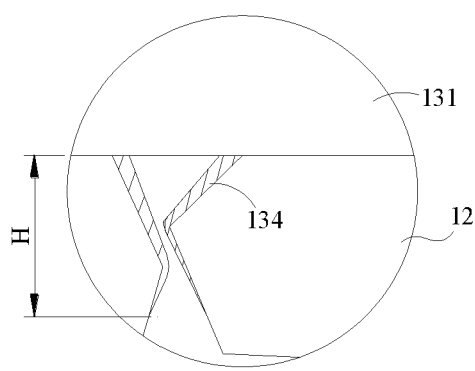
FIG. 6 is an enlarged view of Part A in FIG. 5.

Further, with reference to FIGS. 5 to 6 together, the inorganic dielectric layer 13 may further comprise an extension portion 134 connected to the surface of the main body portion 131 facing toward the negative active material layer 12, the extension portion 134 extending along the wall surface of pores in the negative electrode active material layer 12 away from the main body portion 131 and covering the wall surface of pores in the negative electrode active material layer 12 in the form of a thin film, which can further improve the pre-lithiation rate in the negative electrode plate 10 and the stabilizing effect on the negative electrode interface, thereby further improving the safety performance, cycle performance and storage performance of the lithium-ion battery. The extension portion 134 has an effect on the infiltration and retention of the electrolyte, and thus can also improve the capacity and rate performance of the lithium-ion battery.

In the inorganic dielectric layer 13, the ratio H/T of the dimension H of the extension portion 134 in the thickness direction of the negative electrode active material layer 12 to the thickness T of the main body portion 131 is preferably from 1/1000 to 1/10, which ensures higher lithium ion and electron transport performance in the negative active material layer 12 while effectively exerting the above-mentioned effects of the extension portion 134, so that the lithium-ion battery has a higher comprehensive electrochemical performance. For example, H/T can be 1/500, 1/120, 1/100, 1/80, 1/20, or the like. Further, the inorganic dielectric layer 13 including the main body portion 131 and the extension portion 134 on the first surface 121 of the negative electrode active material layer 12 may have a coverage ratio δ of 50%≤δ≤100%, for example, 50%, 60%, 65%, 70%, 75%, 80%, 85%, 80%, 95%, 100%, and the like, such as 60%~80%.

In some embodiments, the surface of the inorganic dielectric layer 13 away from the negative active material layer 12 is uneven. Thus, in the event that the lithium metal layer 14 is stacked on the inorganic dielectric layer 13, it is possible to form a capillary channel for electrolyte penetration between the lithium metal layer 14 and the inorganic dielectric layer 13 and the electrolyte can quickly fill the capillary channel by capillary action. Such a structure is more conducive to the solvation of the metal lithium in the lithium metal layer 14 under the action of the potential difference, and the diffusion distance of the resulting lithium ions is shorter, so that the lithium metal layer 14 has a higher lithium utilization rate during the pre-lithiation process.

The uneven structure of the surface of the inorganic dielectric layer 13 is not particularly limited, as long as capillary channels can be formed between the lithium metal layer 14 and the inorganic dielectric layer 13 for electrolyte penetration. As an example, the uneven surface of the inorganic dielectric layer 13 may be a rough surface, and the rough surface has many nanometer-scale peaks and valleys with a small distance therebetween; and it is also possible that the surface of the inorganic dielectric layer 13 away from the negative active material layer 12 is processed to form a plurality of nano-scale grooves, thereby forming the above-mentioned uneven surface.

Furthermore, the average size G of the capillary channels in the thickness direction of the inorganic dielectric layer 13 is preferably 0 μm<G≤3 μm, more preferably 0 μm<G≤2 μm. The capillary channels having the above-mentioned average size G in the thickness direction of the inorganic dielectric layer 13 enables the distance between the portion of the lithium metal layer 14 that is not in contact with the inorganic dielectric layer 13 and the inorganic dielectric layer 13 to be small, and enables the electrolyte to fill the capillary pores quickly under the action of the capillary force and the diffusion distance of lithium ions to be short, which can improve the lithium utilization rate of the lithium metal layer 14 during the pre-lithiation process, and improve the pre-lithation uniformity of the negative electrode active material layer 12, thereby improving the battery's cycle life.

In some embodiments, the inorganic dielectric material in the inorganic dielectric layer 13 has a certain ion conductivity. Thus, during the pre-lithiation stage, the lithium metal layer 14 can be intercalated into the negative electrode active material layer 12 at a higher utilization rate and at a more controllable rate; and in the subsequent charge and discharge cycle process, the impedance of the negative electrode plate 10 can be ensured to be relatively small, thereby ensuring that the lithium-ion battery has higher cycle life and good dynamic performance and rate performance.

The inorganic dielectric material may be an average particle size $D_v50$ of from 1 nm to 100 nm, for example, from 3 nm to 50 nm, or from 5 nm to 30 nm. The average particle size $D_v50$ of the inorganic dielectric material being within the above ranges can form channels for ion migration among particles, and improves the ion-conductivity performance of the inorganic dielectric layer 13.

The inorganic dielectric material may include one or more of oxides of element A, nitrides of element A, and halides of element A, where element A is one or more of Al, Si, Ti, Zn, Mg, Zr, Ca, and Ba. The halides of element A comprise one or more of fluoride of element A, chloride of element A, bromide of element A, and iodide of element A, preferably fluoride of element A.

As an example, the inorganic dielectric material is one or more selected from Al oxides (such as $Al_2O_3$, AlO(OH), and the like), Al nitrides, Al fluorides, Si oxides, Si nitrides, Si fluorides, Ti oxides, Ti nitrides, Ti fluorides, Zn oxides, Zn nitrides, Zn fluorides, Mg oxides, Mg nitrides, Mg fluorides, Zr oxides, Zr nitrides, Zr fluorides, Ca oxides, Ca nitrides, Ca fluorides, Ba oxides, Ba nitrides, and Ba fluorides.

In some embodiments, in the negative electrode plate 10 per 2 cm×2 cm unit area, the weight ratio of the lithium metal layer 14 to the inorganic dielectric layer 13 is preferably 2:1 to 200:1, more preferably 5.5 to 101.7. The weight ratio of the lithium metal layer 14 to the inorganic dielectric layer 13 being within the above range can better control the pre-lithiation rate of the negative electrode plate 10, and improve the safety performance and service life of the lithium-ion battery. The weight of the inorganic dielectric layer 13 is very small, which is beneficial to increasing the volume energy density and weight energy density of lithium-ion batteries. For example, in the negative electrode plate 10 with a unit area of 2 cm×2 cm, the weight ratio of the lithium metal layer 14 to the inorganic dielectric layer 13 may be 3.1, 5.5, 7.6, 10, 13.4, 15, 17.3, 20, 27.2, 30.5, 101.7, 120, 150, 180 or the like.

In some embodiments, in the negative electrode plate 10 of a unit area of 2 cm×2 cm, the weight ratio of the lithium metal layer 14 to the negative active material layer 12 is preferably 0.5% to 5%, for example, 1% to 5%. The weight ratio of the lithium metal layer 14 to the negative electrode active material layer 12 being within the above ranges can effectively reduce the capacity loss during the cycle and storage of the lithium-ion battery, and improve the cycle performance and storage performance of the battery. For example, in the negative electrode plate 10 per 2 cm×2 cm unit area, the weight ratio of the lithium metal layer 14 to the negative active material layer 12 may be 1.5%, 2%, 2.54%, 3%, 3.5%, 4% or 4.5%, and the like.

In some embodiments, the binding force between the lithium metal layer 14 and the inorganic dielectric layer 13 is $F_1$, the binding force between the inorganic dielectric layer 13 and the negative active material layer 12 is $F_2$, and the relationship between $F_1$ and $F_2$ satisfies: $0<F_1<F_2$. As a result, the inorganic dielectric layer 13 can be effectively prevented from falling off under the action of external force during the process of setting the lithium metal layer 14 and the subsequent battery winding process, the processing stability of the negative electrode plate 10 is improved, and the preparation excellent rate of the negative electrode plate 10 and the electrode assembly and their reliability during use are improved, thereby helping to improve the performance of the lithium-ion battery.

Preferably, the relationship between $F_1$ and $F_2$ satisfies: $F_1 \leq 0.8 \times F_2$.

Further, the binding force $F_1$ between the lithium metal layer 14 and the inorganic dielectric layer 13 is preferably 2 N/m 25 N/m, for example, 5 N/m~20 N/m, or for example, 8 N/m~15 N/m.

The binding force $F_2$ between the inorganic dielectric layer 13 and the negative electrode active material layer 12 is preferably 10 N/m or more, for example 10 N/m to 400 N/m, for example 10 N/m to 300 N/m, or for example 20 N/m~150 N/m.

The binding force $F_1$ between the lithium metal layer 14 and the inorganic dielectric layer 13 and the binding force $F_2$ between the inorganic dielectric layer 13 and the negative active material layer 12 can be measured using a method and equipment known in the art. As an example, the method for measuring the binding force $F_1$ between the lithium metal layer 14 and the inorganic dielectric layer 13 is as follows. In a drying room with a constant temperature and atmospheric pressure in which the humidity is less than 2% and the temperature is 25° C., a negative electrode plate 10 formed in such a way that a negative electrode active material layer 12, an inorganic dielectric layer 13 and a lithium metal layer 14 are sequentially disposed on one side of a negative electrode current collector 11, and there is no any coating on the other side of the negative electrode current collector 11 is used as a sample to be tested and the width of the sample to be tested is 0.02 m. A 3M double-sided tape is evenly adhered to a stainless steel plate, the uncoated surface of the negative electrode current collector 11 of the sample to be tested is evenly adhered to the double-sided tape. After that, the lithium metal layer 14 of the sample to be tested is subjected to 180° continuous peeling from the inorganic dielectric layer 13 at 50 mm/min with a tensile testing machine such as INSTRON3365. According to the data plot of tensile force versus displacement, the maximum tensile force (in N) is taken and the binding firmness of the lithium metal layer 14 based on the ratio of the maximum tensile force to the width of the sample to be tested, namely the binding force F1 (N/m) between the lithium metal layer 14 and the inorganic dielectric layer 13 is calculated.

In the same way, the method for measuring the binding force $F_2$ between the inorganic dielectric layer 13 and the negative electrode active material layer 12 is as follows. In a drying room with a constant temperature and atmospheric pressure in which the humidity is less than 2% and the temperature is 25° C., a negative electrode plate 10 formed in such a way that a negative electrode active material layer 12 and an inorganic dielectric layer 13 are sequentially disposed on one side of a negative electrode current collector 11, and there is no any coating on the other side of the negative electrode current collector 11 is used as a sample to be tested and the width of the sample to be tested is 0.02 m. A 3M double-sided tape is evenly adhered to a stainless steel plate, the uncoated surface of the negative electrode current collector 11 of the sample to be tested is evenly adhered to the double-sided tape. After that, the inorganic dielectric layer 13 of the sample to be tested is subjected to 180° continuous peeling from the negative electrode active material layer 12 at 50 mm/min with a tensile testing machine such as INSTRON3365. According to the data plot of tensile force vs. displacement, the maximum tensile force (in N) is taken and the binding firmness of the inorganic dielectric layer 13 based on the ratio of the maximum tensile force to the width of the sample to be tested, namely the binding force $F_2$ (in N/m) between the inorganic dielectric layer 13 and the negative electrode active material layer 12 is calculated.

There is no specifically limitation to the thickness of the negative electrode active material layer 12 according to embodiment of the present application, and those skilled in the art can adjust it according to actual needs. In some embodiments, the thickness of the negative active material layer 12 may be from 90 μm to 200 μm, for example, from 100 μm to 130 μm.

There is no particular limitation on the types of negative electrode active materials according to embodiments of the present application, and negative electrode active materials known in the art that can insert/release lithium ions can be used. As an example, the negative electrode active materials may be one or more of natural graphite, artificial graphite, soft carbon, hard carbon, mesocarbon microspheres, nanocarbon, elemental silicon, silicon-oxygen compound, silicon-carbon composite, silicon alloy, elemental tin, tin-oxygen compound tin-carbon composite, tin alloy and lithium titanate.

As the above-mentioned silicon-oxygen compound, it may be a compound with molecular formula of $SiO_x$ in which $0<x<2$, such as silicon oxide.

As the above-mentioned silicon-carbon composite, it may be one or more of carbon-coated silicon, carbon-coated silicon-oxygen compound, a mixture of silicon and carbon, a mixture of silicon-oxygen compound and carbon, and a mixture of silicon, silicon-oxygen compound and carbon, wherein the carbon can be one or more of graphite, soft carbon and hard carbon.

As an example, the above mentioned tin alloys can be selected from Li—Sn alloy and Li—Sn—O alloy; the tin oxide compound can be selected from $SnO$ and $SnO_2$; the above mentioned lithium titanate is, for example, $Li_4Ti_5O_{12}$ with a spinel structure.

In some embodiments, the average particle diameter Dv50 of the negative active material may be from 6 μm to 10 μm.

The negative active material layer 12 may also optionally include a binder, a conductive agent, and/or other auxiliary agents. The types of the binder and the conductive agent are not specifically limited, and can be selected according to requirements. As an example, the binder may be one or more of styrene butadiene rubber (SBR), water-based acrylic resin, polyvinylidene fluoride (PVDF), polyvinyl butyral (PVB), polytetrafluoroethylene (PTFE), ethylene-vinyl acetate copolymer (EVA) and polyvinyl alcohol (PVA). The conductive agent may be one or more of graphite, superconducting carbon, acetylene black, carbon black, Ketjen black, carbon dots, carbon nanotubes, graphene, and carbon nanofibers. Examples of other auxiliary agents are thickeners, such as sodium carboxymethyl cellulose (CMC-Na).

In an embodiment of the present application, the negative electrode plate 10 has a compacted density of preferably 1.2 g/cm³~2.0 g/cm³. The compacted density of the negative electrode plate 10 within an appropriate range enables the battery to have a higher energy density and cycle life.

The compacted density C of the negative electrode plate 10 has a well-known meaning in the art, and can be measured by a method and equipment known in the art. For example, it can be calculated according to the formula C=(m×w)/(s×D), where m is the mass of the negative active material layer 12, w is the mass fraction of the negative active material in the negative active material layer 12, s is the area of the negative active material layer 12, and D is the thickness of the negative electrode active material layer 12.

In an embodiment of the present application, the negative electrode plate 10 has a porosity of preferably 25% to 60%, for example, 30% to 45%. The porosity of the negative electrode plate 10 within a proper range enables the negative electrode plate 10 to have higher lithium ion and electron transport performance, and a suitable electrolyte infiltration amount, which is beneficial to improving the cycle life and energy density of the lithium-ion battery.

The porosity of the negative electrode piece 10 has a meaning known in the art, and can be measured by a method and equipment known in the art. For example, it can be measured by a gas replacement method. The true density meter (such as AccuPyc II 1340) can be used for testing. The test can refer to the standard GB/T 24586-2009 "Determination of apparent density, true density and porosity of iron ore".

In embodiments of the present application, the type of the negative electrode current collector 11 is not subject to specific limitations, and materials with good electrical conductivity and mechanical properties can be selected according to requirements. For example, a metal foil, a carbon-coated metal foil, or a porous metal plate can be used, such as copper foil.

Next, a process for preparing the negative electrode plate 10 is provided comprising the following steps:

S100, disposing a negative electrode active material layer 12 on at least one surface of a negative electrode current collector 11;

S200, depositing an inorganic dielectric material on the first surface 121 of the negative electrode active material layer away from the negative electrode current collector 11 to form an inorganic dielectric layer 13; and S300, disposing a lithium metal layer 14 on the surface of the inorganic dielectric layer 13 away from the negative electrode active material layer 12 to obtain the negative electrode plate 10.

In some embodiments, in step S100, a negative electrode active material, a binder, and a conductive agent are dispersed in a solvent, in which the solvent can be deionized water or N-methylpyrrolidone (NMP), to form a uniform negative electrode slurry; and then the negative electrode slurry is coated on the surface of the negative electrode current collector 11 followed by drying and other processes, thereby forming the negative electrode active material layer 12 on the surface of the negative electrode current collector 11.

In other embodiments, in step S100, a negative electrode active material is deposited on the negative electrode current collector 11 to obtain the negative electrode active material layer 12. For example, the negative electrode active material is deposited on the negative electrode current collector 11 with a vapor deposition process. The vapor deposition process may be one or more of Atomic Layer Deposition (ALD), Chemical Vapor Deposition (CVD) and Physical Vapor Deposition (PVD), for example, one or more of Thermal Evaporation Deposition, Plasma Assisted Thermal Evaporation, Electron Beam Evaporation Method (EBEM), Plasma Assisted Electron Beam Evaporation, Reactive Ion-beam Sputtering (RIBS), and Magnetron Sputtering (MS) and Arc Ion Plating (AIP).

In step S200, an inorganic dielectric material may be deposited on the first surface 121 of the negative active material layer 12 with a vapor deposition process to obtain the inorganic dielectric layer 13. The bonding force between the inorganic dielectric layer 13 and the negative active material layer 12 formed by the vapor deposition process is stronger, which effectively avoid the inorganic dielectric layer 13 from peeling from the surface of the negative active material layer 12 during the long-term cycle of the battery and the mechanical abuse.

In the vapor deposition process, the inorganic dielectric material can not only be deposited on the first surface 121 of the negative active material layer 12 to form the main body portion 131 of the inorganic dielectric layer 13, but can also diffuse through the first surface 121 into the inner pores of the negative active material layer 12 to deposit on the wall surface of the pores, thereby forming the extension portion 134 of the inorganic dielectric layer 13.

As the deposition process progresses, the thickness of the main body portion 131 of the inorganic dielectric layer 13 continues to increase, and the thickness of the extension portion 134 on the wall surface of pores of the negative electrode active material layer 12 adjacent to the inorganic dielectric layer also continues to increase. Thus, the resistance of the active material layer 12 to spreading and spreading inside the active material layer 12 is increasing, and then the thickness of the extension portion 134 decreases in the thickness direction of the negative electrode active material layer 12. In this way, the negative electrode active material layer 12 at the site far from the negative electrode current collector 11 has a smaller pore size and lower porosity, while the negative electrode active material layer 12 at the site closer to the negative electrode current collector 11 has a larger pore size and a higher porosity.

In step S200, the vapor deposition process can be the vapor deposition process described above, which will not be repeated here.

As an example, the inorganic dielectric layer is prepared with a thermal evaporation process and the step 5200 may include the following steps:

S210. A deposition chamber is evacuated to a pressure below 0.1 Pa, such as below 0.001 Pa.

S220. A reactive gas a is introduced into the deposition chamber. The reactive gas a can be one or more of oxygen, ozone, carbon dioxide, water vapor, nitrogen, nitrogen monoxide, nitrogen dioxide, and ammonia.

S230, An inorganic dielectric material precursor b is heated into a gaseous state in a heating chamber, and then supplied into the deposition chamber. The inorganic dielectric material precursor b may be one or more of elements, alloys, alkyl compounds, nitrates, acetates, and sulfates containing elemental A.

S240. In the deposition chamber, the concentration of the gaseous inorganic dielectric material precursor b, the temperature in the chamber, the deposition distance and the deposition time and other parameters are adjusted and the reactive gas a and the gaseous inorganic dielectric material precursor b chemically react with each other, thereby forming an inorganic dielectric layer 13 on the surface of the negative electrode active material layer 12.

As another example, a plasma-assisted electron beam evaporation method is used to prepare an inorganic dielectric layer, and step 5200 may comprise the following steps:

S210'. A reaction chamber is evacuated to a pressure of 0.1 Pa or less, such as 0.001 Pa or less.

S220'. A reactive gas a is introduced into an inductively coupled plasma (ICP) source. The reactive gas a can be diluted by an inert gas. Under the action of the ICP source, the reactive gas a produces a plasma containing element B and the element B is one or more of O, N, F, Cl, Br, and I.

As an example, the reactive gas a may be as described above, and the inert gas may be one or more of argon, nitrogen, and helium.

The ICP source may have a power of 300 W~600 W.

The reactive gas a may have a flow rate of 200 sccm~1000 sccm.

S230'. In a reaction chamber, an electron gun generates an electron beam, and the electron beam hits a target c containing element A so that it melts and evaporates. The gaseous material chemically reacts with the plasma and deposits on the surface of the negative electrode active material layer 12 to form an inorganic material. Dielectric layer 13.

As an example, the target c containing element A may be one or more of elements and alloys containing element A.

The electron beam may have a voltage of 6 kV to 12 kV, and the surface temperature of the negative active material layer 12 is preferably controlled to be less than or equal to 100° C. For example, the surface temperature of the negative active material layer 12 is from 20° C. to 100° C., such as from 60° C. to 90° C.

Those skilled in the art can, based on the basic knowledge and principles of plasma-assisted electron beam evaporation deposition technology, adjust one or more of the parameters such as the vacuum degree of the reaction chamber, the electron beam voltage, the composition and flow rate of the reactive gas a, the composition of the target c containing element A, the ICP source, the surface temperature of the negative electrode active material layer 12, and the process time and the like, to adjust the composition, thickness, morphology of the inorganic dielectric layer 13 and the particle size of the inorganic dielectric material in the inorganic dielectric layer 13 and other parameters.

In step S200, an inorganic dielectric layer 13 with a sheet-like structure can be obtained, and the aforementioned openings can be further formed in the inorganic dielectric layer 13 in any manner, for example, by cold pressing the inorganic dielectric layer 13. It is also possible to use a template, such as a mask, to directly form an inorganic dielectric layer 13 with openings penetrating through its thickness direction.

In step S200, an inorganic dielectric layer 13 including a plurality of inorganic dielectric regions 133 may also be formed in any manner, for example, with a template such as a mask.

In step S300, the raw material and form of the lithium metal layer 14 are not limited, and the raw material of the lithium metal layer 14 can be one or more selected from lithium powder, lithium ingot, lithium flake, and lithium strip. The lithium metal layer 14 may not be completely and densely, uniformly distributed on the surface of the inorganic dielectric layer 13. For example, when the raw material of the lithium metal layer 14 is lithium powder, there may be a certain gap between lithium powder particles in the lithium metal layer 14, and the gap size can be controlled within 1 μm~5000 μm; when the raw material of the lithium metal layer 14 is lithium ingot, lithium strip or lithium flake, a plurality of lithium strips (or lithium flakes) can also be disposed on the surface of the inorganic dielectric layer 13 at intervals, and the distance between two adjacent lithium strips (or lithium flakes) can be controlled at 1 μm~5000 μm. After an electrolyte is injected, the lithium metal layer 14 is pre-intercalated into the negative electrode active material layer 12, and finally the lithium content in the negative electrode active material layer 12 can still be distributed uniformly, thereby achieving uniform pre-lithiation.

In step S300, the lithium metal layer 14 can be disposed on the surface of the inorganic dielectric layer 13 by rolling, and the lithium metal layer 14 is stably fixed on the surface of the electrical layer 13 with the intermolecular force between the lithium metal and the inorganic dielectric layer 13.

In some embodiments, the negative active material layer 12 is obtained by coating with a negative electrode slurry, and the inorganic dielectric layer 13 is a sheet-shaped structure with crack-like openings as described above. In these embodiments, the process for preparation of the negative electrode plate 10 comprises the following steps: in step S100 the dried negative electrode active material coating may be cold pressed to obtain the negative electrode active material layer 12 with a preset compacted density; in step S200, the inorganic dielectric layer 13 deposited by the inorganic dielectric material is subjected to pressing, such as cold pressing, to form crack-like openings in the inorganic dielectric layer 13; and then the lithium metal layer 14 is prepared on the surface of the inorganic dielectric layer 13.

It is also possible that the dried negative electrode active material coating is obtained in step S100 first, and then when the inorganic dielectric layer 13 is cold pressed in step S200, the negative electrode active material coating is simultaneously subjected to cold pressing to obtain the negative electrode active material layer 12 with a preset compacted density and form the aforementioned crack-like openings in the inorganic dielectric layer 13 at the same time; and then, the lithium metal layer 14 is prepared on the surface of the inorganic dielectric layer 13.

It is also possible that the dried negative active material coating is obtained in step S100, and the inorganic dielectric layer 13 with a sheet-like structure is obtained in step S200, and then when the lithium metal layer 14 is prepared on the surface of the inorganic dielectric layer 13 by rolling, the inorganic dielectric layer 13 is subjected to cold pressing and the negative electrode active material layer is subjected to code pressing at the same time, thereby obtaining the lithium metal layer 14, the negative electrode active material layer 12 with a preset compaction density, and the aforementioned crack-like openings in the inorganic dielectric layer 13 at the same time.

Through the process for preparation of the negative electrode plate 10 described in embodiments of the present application, the above-mentioned negative elected plate 10 of the present application can be realized.

Electrode Assembly

The present embodiments also provide an electrode assembly. The electrode assembly comprises a positive electrode plate, a negative electrode plate, and a separator and the separator is disposed between the positive electrode plate and the negative electrode plate for isolation and the negative electrode plate is the negative electrode plate 10 provided in embodiments of the present application.

It should be noted that the electrode assembly in embodiments of the present application refers to a battery cell that has not been infiltrated with an electrolyte. In a narrow sense, the electrode assembly of the present application may only comprise a positive electrode plate, a separator, and a negative electrode plate. The electrode assembly of the present application in a broad sense may further comprise other structures, such as terminal components, protective shell components, and the like.

Since the negative electrode plate 10 described in embodiments of the present application is adopted, the electrode assembly of embodiments of the present application also has the corresponding beneficial effects, which will not be repeated here.

Further, according to the electrode assembly of embodiments of the present application, in the negative electrode plate 10 with a 2 cm×2 cm unit area, a weight ratio of the lithium metal layer 14 to the negative electrode active material layer 12 is 0.5%~5%, further 1%~5%; a ratio of a capacity C1 of negative electrode per unit area to a capacity C2 of positive electrode per unit area is 1.2~2.1, further 1.3~2.1; and the capacity C1 of negative electrode per unit area, the capacity C2 of positive electrode per unit area and a capacity C3 of lithium metal layer per unit area satisfy $C1/(C2+C3\times K) \geq 1.05$, further $C1/(C2+C3\times K) \geq 1.10$, where K is a utilization rate of metal lithium in the lithium metal layer 14.

In the context, the capacity C1 of negative electrode per unit area=the weight of the negative electrode active material×the reversible gram capacity of the negative electrode active material in the negative electrode active material layer with a unit area.

The capacity C2 of positive electrode per unit area=the weight of the positive electrode active material×the reversible gram capacity of the positive electrode active material in the positive electrode active material layer with a unit area.

The capacity C3 of lithium metal layer per unit area refers to the theoretical capacity of lithium metal layer per unit area. The capacity C3 of the lithium metal layer per unit area=the weight of the metal lithium×the theoretical gram capacity of the metal lithium in the lithium metal layer with a unit area. Due to the possibility of oxidation of some lithium metal in the lithium metal layer 14 and participation of some lithium ions in forming the negative electrode, the utilization rate of metal lithium in the lithium metal layer 14 is generally less than 100%. According to the research experience, the metal lithium in the lithium metal layer 14 has the utilization rate of generally 75%~85%, such as 78%~82%, and for example 80%. Of course, by reducing the oxidation of metal lithium in the lithium metal layer 14 and reducing the participation of lithium ions from the lithium metal layer 14 in forming the negative electrode, the utilization rate can be improved.

The electrode assembly of embodiments of the present application satisfying the above relationship enables the vacancy provided by the negative active material in the negative active material layer 12 to fully accommodate all pre-intercalated lithium ions from the lithium metal layer 12, and receive all lithium ions from the positive electrode during the first charge, thereby avoiding accumulation of a large amount of lithium ions on the interface of the negative electrode to prevent lithium deposition on the negative electrode.

The electrode assembly of embodiments of the present application satisfying the above relationship may better improving the cycle life, safety performance, and storage performance of the battery cell.

In the electrode assembly of embodiments of the present application, after the electrolyte is injected, the negative electrode pre-lithiation occurs inside the electrode assembly, and at least a part of the metallic lithium of the lithium metal layer 14 is pre-intercalate into the negative electrode active material, and exists in the form of a prelithiated negative electrode active material so that the open circuit voltage of the electrode assembly is close to the voltage after the first charging and discharging cycle. When the electrode assembly is fully charged, the negative active material has enough vacancies to receive all lithium ions from the positive active material and all lithium ions from the lithium metal layer 14, and when the electrode assembly is fully discharged, excess lithium ions are stored in the negative electrode, so that after the discharging is cut off, the negative electrode still has 5%~97% (relative to the capacity of positive electrode) of lithium ions that can shuttle between the positive and negative electrodes. In other words, the negative electrode has 105%~197% of lithium-rich content (relative to the capacity of the positive electrode) after the first battery charging cycle, so it can effectively reduce the capacity loss during the charging and discharging cycle and storage of the battery, and improve the cycle life and storage performance of the battery.

In the electrode assembly of embodiments of the present application, the positive electrode plate may include a positive electrode current collector and a positive electrode active material layer disposed on at least one surface of the positive electrode current collector.

For example, the positive electrode current collector comprises two opposite surfaces along the thickness direction of the positive electrode current collector, and the positive electrode active material layer may be disposed on either of the two surfaces, or may be provided on the two surfaces.

According to embodiments of the present application, there is no specific limitation on the thickness of the positive electrode active material layer, and those skilled in the art can adjust it according to actual needs. In some embodiments, the thickness of the positive electrode active material layer may be from 100 μm to 180 μm, for example, from 110 μm to 130 μm.

The positive active material in the positive active material layer is not particularly limited, as long as it is a material that can be reversibly intercalated and deintercalated by lithium ions, such as one or more of lithium transition metal composite oxide, lithium transition metal composite oxide incorporated by other transition metals or non-transition metal or non-metal composite oxides. The transition metal can be one or more of Mn, Fe, Ni, Co, Cr, Ti, Zn, V, Al, Zr, Ce, and Mg.

As an example, the positive electrode active material may be one or more selected from lithium cobalt oxide, lithium nickel oxide, lithium manganese oxide, lithium nickel manganese oxide, lithium nickel cobalt manganese oxide, lithium nickel cobalt aluminum oxide, lithium-containing phosphates with an olivine structure. The lithium-containing phosphates with an olivine structure can have the molecular formula of $LiFe_{1-x-y}Mn_xM_yPO_4$ in which $0 \leq x \leq 1$, $0 \leq y \leq 0.1$, $0 \leq x+y \leq 1$, and M is one or more selected from other transition metal elements than Fe and Mn or non-transition metal elements. Optionally, the lithium-containing phosphate with an olivine structure is one or more of lithium iron phosphate, lithium manganese phosphate, and lithium iron manganese phosphate.

The positive active material layer may also comprise a binder and/or a conductive agent. There is no limitation on the type of the binder and the conductive agent in the application, which can be selected according to actual needs. As an example, the binder may be one or more of polyvinylidene fluoride (PVDF), polytetrafluoroethylene, vinylidene fluoride-tetrafluoroethylene-propylene terpolymer, vinylidene fluoride-hexafluoropropylene-tetrafluoro ethylene terpolymer, tetrafluoroethylene-hexafluoropropylene copolymer and fluorine-containing acrylic resin; the conductive agent may be one or more of graphite, superconducting carbon, acetylene black, carbon black, Ketjen black, carbon dots, carbon nanotubes, graphene and carbon nanofibers.

The type of positive electrode current collector is not subject to specific limitation, and materials with good electrical conductivity and mechanical properties can be selected according to requirements. For example, the positive electrode current collector can be a metal foil, a carbon-coated metal foil or a porous metal plate, such as, an aluminum foil.

The positive electrode plate can be prepared according to the conventional method in the art. Generally, the positive active material, as well as a conductive agent and a binder are dispersed in a solvent such as N-methylpyrrolidone, so as to form a uniform positive slurry. The positive slurry is coated on a positive current collector, followed by drying and cold pressing, thereby obtaining a positive electrode plate.

There is no specific limitation on the type of separator in the electrode assembly. It can be any separator that can be used in lithium-ion battery, such as glass fiber separator, non-woven separator, polyethylene separator, polypropylene separator, Polyvinylidene fluoride separator, and a multi-layer composite film formed by one or more of them, but not limited thereto.

Lithium-Ion Battery

Embodiments of the present application also provide a lithium-ion battery. The lithium-ion battery comprises an electrode assembly and an electrolyte, in which the electrode assembly is the electrode assembly provided in embodiments of the present application.

Due to the use of the electrode assembly described in embodiments of the present application, the lithium-ion battery of embodiments of the present application also has corresponding beneficial effects.

The electrolyte includes an organic solvent and a lithium salt. According to embodiments of the present application, there is no specific limitation on the type of organic solvent and lithium salt, which can be selected according to requirements.

As an example, the organic solvent may be one or more, preferably two or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

The lithium salt can be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (Lithium dis-trifluoromethanesulfonimide), LiTFS (lithium trifluoromethanesulfonate), LiDFOB (lithium difluorooxalateborate), LiBOB (lithium bisoxalateborate), $LiPO_2F_2$ (lithium difluorophosphate), LiDFOP (lithium difluorodioxalate phosphate), and LiTFOP (lithium tetrafluorooxalate phosphate).

The electrolyte may also optionally include additives. There is no specific limitation on the type of additive, which can be selected according to needs, such as one or more of vinylene carbonate (VC), vinyl ethylene carbonate (VEC), fluoro ethylene carbonate (FEC), succinonitrile (SN), adiponitrile (ADN), 1,3-propylene sultone (PST), tris(trimethylsilane) phosphate (TMSP) and tris(trimethylsilane) borate (TMSB).

The above-mentioned positive electrode plate, separator, and negative electrode plate are stacked in order, so that the separator is disposed between the positive electrode plate and the negative electrode plate for isolation, thereby obtaining an electrode assembly, or they can be wound to obtain an electrode assembly. The electrode assembly is placed in a packaging case in which an electrolyte is injected and then the package case are sealed to obtain a lithium-ion battery.

Figure 7:
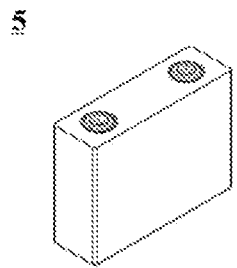
FIG. 7 is a schematic diagram of a lithium-ion battery according to an embodiment of the present application.

The shape of the lithium-ion battery is not particularly limited in the present application, and may be cylindrical, square, or any other shape. FIG. 7 illustrates a lithium-ion battery 5 having a rectangular structure as an example.

In some embodiments, the lithium-ion battery may include an outer package for encapsulating the electrode assembly and the electrolyte.

In some embodiments, the outer package of the battery may be a hard shell, such as a hard plastic shell, an aluminum shell, a steel shell and the like. The outer package of the lithium-ion battery may also be a soft package, such as a pouch. The material of the soft package may be plastic, such as one or more of polypropylene PP, polybutylene terephthalate PBT, polybutylene succinate PBS, and the like.

Figure 8:
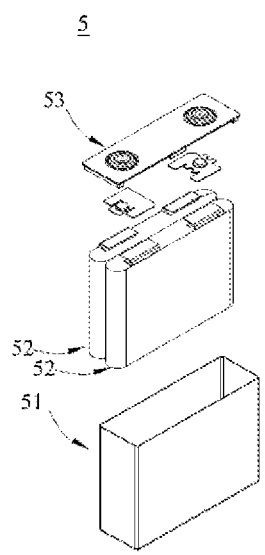
FIG. 8 is an exploded view of FIG. 7.

In some embodiments, referring to FIG. 8, the outer package may include a housing 51 and a cover 53 in which the housing 51 may include a base plate and side plates connected to the base plate, and the base plate and the side plates are enclosed to form an accommodating cavity. The housing 51 has an opening communicating with the accommodating cavity, and the cover plate 53 can cover the opening to close the accommodating cavity. The positive electrode plate, the negative electrode plate, and the separator may be stacked or wounded into an electrode assembly 52. The electrode assembly 52 is encapsulated in the accommodating cavity and is immersed by an electrolyte.

The number of electrode assembly 52 contained in the lithium-ion battery 5 can be one or several, which can be adjusted according to requirements.

In some embodiments, the lithium-ion battery can be assembled into a battery module. The battery module may include a plurality of lithium ion batteries, and the specific number can be adjusted according to the application and desirable capacity of the battery module.

Figure 9:
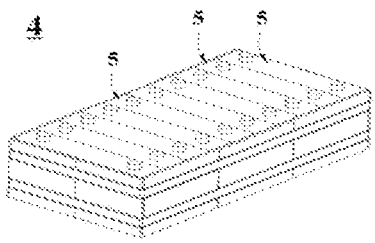
FIG. 9 is a schematic diagram of a battery module according to an embodiment of the present application.

FIG. 9 illustrates a battery module 4 as an example. Referring to FIG. 9, in the battery module 4, a plurality of lithium ion batteries 5 are sequentially arranged along a length direction of the battery module 4. It is also possible that a plurality of lithium ion batteries 5 are arranged in any other manner. Further, a plurality of lithium ion batteries 5 can be fixed by a fastener.

Optionally, the battery module 4 may further include a casing having a receiving space, in which a plurality of lithium ion batteries 5 are received.

In some embodiments, the above battery module can also be assembled into a battery pack, and the number of battery modules included in the battery pack can be adjusted according to the application and capacity of the battery pack.

Figure 10:
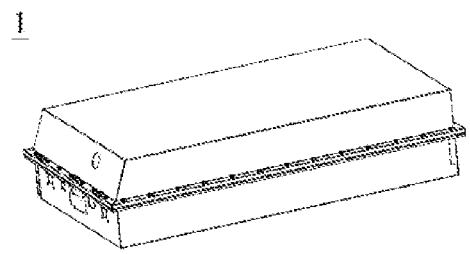
FIG. 10 is a schematic diagram of a battery pack according to an embodiment of the present application.
Figure 11:
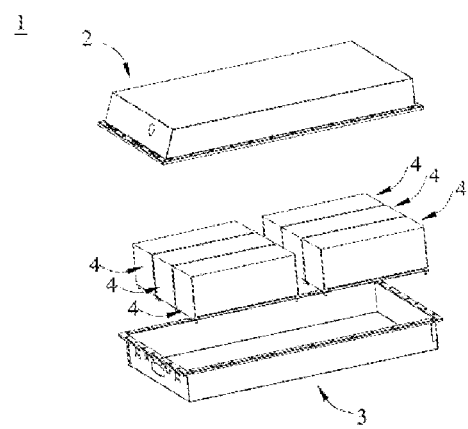
FIG. 11 is an exploded view of FIG. 9.

FIG. 10 and FIG. 11 illustrate a battery pack 1 as an example. With reference to FIG. 10 and FIG. 11, the battery pack 1 may include a battery box and a plurality of battery modules 4 provided in the battery box. The battery box includes an upper box 2 and a lower box 3 and the upper box 2 is arranged to cover the lower box 3, so as to form a closed space for receiving the battery modules 4. A plurality of battery modules 4 can be arranged in the battery box in any manner.

Apparatus

The present application provides an apparatus including the lithium ion batteries according to the present application. The lithium-ion battery may be used as a power source of the apparatus or as an energy storage unit of the apparatus. The apparatus may be, but is not limited to, a mobile device (such as a mobile phone, a notebook computer, and the like), an electric vehicle (such as a pure electric vehicle, a hybrid electric vehicle, a plug-in hybrid electric vehicle, an electric bicycle, an electric scooter, and an electric golf vehicles, electric trucks, and the like), electric trains, ships and satellites, energy storage systems, or the like.

The apparatus can adopt a lithium-ion battery, a battery module, or a battery pack, according to application requirements.

Figure 12:
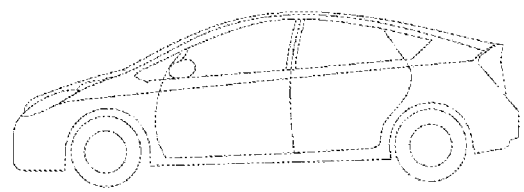
FIG. 12 is a schematic diagram of an apparatus according to an embodiment of the present application in which a lithium-ion battery is used as a power source.

FIG. 12 illustrates an apparatus as an example. The apparatus is a pure electric vehicle, a hybrid electric vehicle, or a plug-in hybrid electric vehicle. In order to meet the requirements of the apparatus for high power and high energy density of lithium-ion battery, a battery pack or a battery module can be used.

As another example, the apparatus may be a mobile phone, a tablet computer, a notebook computer, and the like. The apparatus is generally required to be thin and light, and a lithium-ion battery can be used as a power source.

EXAMPLES

The following examples are intended to describe the present application more specifically, merely for the purpose of illustration. Various modifications and variations within the scope of the present application are apparent to those skilled in the related art. The parts, percentages, and ratios mentioned in the following examples are accounted by weight unless otherwise stated, all reagents used in the examples are commercially available or can be directly synthesized according to conventional method without further processing, and the instruments used in the examples are also commercially available.

In the following examples, the coating weight of the positive electrode slurry and the coating weight of the negative electrode slurry are based on a single-sided coating without solvent; and the unit area is calculated based on the area of 1540.25 mm$^2$.

Example 1

Preparation of Positive Electrode Plate

Lithium nickel cobalt manganese oxide ($LiNi_{0.8}Co_{0.1}Mn_{0.1}O_2$) as a positive electrode active material, acetylene black as a conductive agent, and PVDF a binder at a weight ratio of 94:4:2 were dispersed in a solvent NMP, stirred and mixed well to obtain a positive electrode slurry. The positive electrode slurry was coated on two opposite surfaces of a positive electrode current collector aluminum foil in coating weight of 0.145 g/1540.25 mm$^2$; after drying and cold pressing, a positive electrode plate was obtained. Lithium nickel cobalt manganese oxide has a reversible gram capacity of 190 mAh/g.

Preparation of Negative Electrode Plate

Artificial graphite as a negative active material, acetylene black as a conductive agent, styrene butadiene rubber SBR as a binder, and sodium carboxymethyl cellulose (CMC-Na)

as a thickener at a weight ratio of 95:1.5:3.1:0.4 were dispersed in a solvent deionized water, and then a negative electrode slurry was obtained after stirring and mixing uniformly. The artificial graphite has a reversible gram capacity of 340 mAh/g.

Afterwards, the negative electrode slurry was coated on two opposite surfaces of a negative electrode current collector copper foil in coating weight of 0.120 g/1540.25 mm$^2$; after drying and cold pressing, a negative electrode active material layer was obtained in which the negative electrode active material layer has a thickness of 120 μm.

Afterwards, an inorganic dielectric layer was prepared on the surface of the negative electrode active material layer facing away from the negative electrode current collector by plasma-assisted thermal evaporation deposition technology. The heating source is electron beam and the heating target is elemental aluminum. Under vacuum conditions, an active gas of oxygen is used as a reaction gas, the surface temperature of the negative electrode active material layer is controlled to from 90° C. to 110° C., and the window width during the manufacturing process is equal to 80% of the width of the negative electrode plate, the electron beam voltage is 10 kV, the vacuum degree of the process chamber is 10$^{-2}$ Pa, the oxygen flow rate is 800 sccm, the power of the ICP source is 300 W, and the process time is 1 h.

The thickness of the main body portion can be measured with instruments and methods known in the art. For example, an ion polisher (IB-19500CP) can be used to cut the negative electrode plate to obtain a smooth section of the negative electrode plate; then the electrode plate is put under a scanning electron microscope (Sigma300) to observe the section of the negative electrode plate and measure the thickness of the main body portion. The measurement can refer to Method General Rules for JY/T010-1996 Analytical Scanning Electron Microscope. The coverage ratio of the inorganic dielectric layer on the surface of the negative electrode active material layer, the dimension of the extension portion in the thickness direction of the negative electrode active material layer and the thickness ratio of the extension portion to the main body portion are taken the average by randomly scanning 6 regions.

In connection with the scanning electron microscope (SEM) spectrum of the surface and cross-section, and the X-ray energy disperse spectroscopy (EDS) elemental analysis, it was found that the inorganic dielectric layer included the main body portion and extension portions described above, and the main body portion was disposed on the surface of the negative active material layer in a lamellar structure and has a thickness T of 200 nm; and the extension portion has a dimension in the thickness direction of the negative active material layer, which was 1/100 of the thickness of the main body portion; and that the coverage ratio δ of the inorganic dielectric layer on the surface of the negative electrode active material layer was 80%. The surface of the inorganic dielectric layer away from the negative active material layer is a rough surface. The inorganic dielectric material in the inorganic dielectric layer was alumina. The binding force F$_2$ between the inorganic dielectric layer and the negative electrode active material layer was determined to be 35 N/m using the aforementioned measuring method.

Afterwards, a lithium metal sheet was laminated on the surface of the inorganic dielectric layer facing away from the negative electrode active material layer by rolling to obtain a lithium metal layer whose sizes in the lengthwise and widthwise directions of the negative electrode plate were approximately equal to those of the inorganic dielectric layer; the weight of the lithium metal layer was 3.05 mg/1540.25 mm$^2$, and the theoretical gram capacity of metal lithium was 3861.3 mAh/g.

The weight ratio of the lithium metal layer per unit area to the inorganic dielectric layer per unit area was 15.3.

The cross-section of the above-mentioned negative electrode plate was tested with SEM (Sigma300). A capillary channel for electrolyte penetration as formed between the lithium metal layer and the inorganic dielectric layer was measured at 10 arbitrary positions to obtain through calculation the average size G of the capillary channel in the thickness of the inorganic dielectric layer of 1.0 μm.

The binding force F1 between the lithium metal layer and the inorganic dielectric layer was determined to be 10 N/m using the measurement method described above.

Preparation of Electrolyte

In an argon atmosphere glove box with a water content of less than 10 ppm, ethylene carbonate (EC), propylene carbonate (PC) and dimethyl carbonate (DMC) were mixed homogenously at a weight ratio of 1:1:1, thereby obtain an organic solvent; then a lithium salt LiPF6 was dissolved in the above organic solvent with mixing uniformly to obtain an electrolyte in which the concentration of LiPF$_6$ was 1 mol/L.

Lithium-Ion Battery Preparation

The positive electrode plate, a polyethylene porous separator, and the negative electrode plate were laminated in order, and then wound to obtain an electrode assembly; the electrode assembly was placed in an outer package in which the electrolyte was injected and then the outer package was packaged to obtain a lithium-ion battery.

The weight ratio of the lithium metal layer per unit area to the negative electrode active material layer per unit area=(3.05 mg/1540.25 mm$^2$)/(0.120 g/1540.25 mm$^2$)×100%=2.54%

Capacity C1 of negative electrode plate per unit area=0.120 g×95%×340 mAh/g=38.76 mAh Capacity C2 of positive electrode plate per unit area=0.145 g×94%×190 mAh/g=25.90 mAh CB value=Capacity C1 of negative electrode plate per unit area/Capacity C2 of positive electrode plate per unit area=38.76 mAh/25.90 mAh=1.50

CBL value=Capacity C1 of negative electrode plate per unit area/(Capacity C2 of positive electrode plate per unit area+Capacity C3 of lithium metal layer per unit area×K)= 38.76 mAh/(25.90 mAh+3.50 mg×3861.3 mAh/g×80%)= 1.10.

Example 2

Example 1 was repeated with the exception that the coating weight of the negative electrode slurry was 0.104 g/1540.25 mm$^2$; the dimension of the extension portion of the inorganic dielectric layer in the thickness direction of the negative active material layer was 1/80 of the thickness of the main body portion; the weight of the lithium metal layer was 1.52 mg/1540.25 mm$^2$; the weight ratio of the lithium metal layer per unit area to the inorganic dielectric layer per unit area was 7.6; the average size G of the capillary channel in the thickness direction of the inorganic dielectric layer was 2.0 μm; and the binding force F$_1$ between the lithium metal layer and the inorganic dielectric layer was 15 N/m.

Example 3

Example 1 was repeated with the exception that the coating weight of the positive electrode slurry was 0.164 g/1540.25 mm², the coating weight of the negative electrode slurry was 0.136 g/1540.25 mm², the dimension of the extension portion of the inorganic dielectric layer in the thickness direction of the negative active material layer was 1/120 of the thickness of the main body portion; the weight of the lithium metal layer was 3.45 mg/1540.25 mm²; the weight ratio of the lithium metal layer per unit area to the inorganic dielectric layer per unit area was 17.3; and the average size G of the capillary channel in the thickness direction of the inorganic dielectric layer was 1.0 μm.

Example 4

Example 1 was repeated with the exception that the coating weight of the positive electrode slurry was 0.189 g/1540.25 mm², the coating weight of the negative electrode slurry was 0.136 g/1540.25 mm², the dimension of the extension portion of the inorganic dielectric layer in the thickness direction of the negative active material layer was 1/120 of the thickness of the main body portion; the weight of the lithium metal layer was 1.99 mg/1540.25 mm²; the weight ratio of the lithium metal layer per unit area to the inorganic dielectric layer per unit area was 10; and the average size G of the capillary channel in the thickness direction of the inorganic dielectric layer was 1.5 μm and the binding force $F_1$ between the lithium metal layer and the inorganic dielectric layer was 12 N/m.

Example 5

Example 1 was repeated with the exception that the coating weight of the positive electrode slurry was 0.129 g/1540.25 mm², the coating weight of the negative electrode slurry was 0.136 g/1540.25 mm²; the dimension of the extension portion of the inorganic dielectric layer in the thickness direction of the negative active material layer was 1/120 of the thickness of the main body portion; the weight of the lithium metal layer was 5.44 mg/1540.25 mm²; the weight ratio of the lithium metal layer per unit area to the inorganic dielectric layer per unit area was 27.2; and the average size G of the capillary channel in the thickness direction of the inorganic dielectric layer was 0.5 μm and the binding force $F_1$ between the lithium metal layer and the inorganic dielectric layer was 9 N/m.

Example 6

Example 1 was repeated with the exception that the coating weight of the positive electrode slurry was 0.117 g/1540.25 mm², the coating weight of the negative electrode slurry was 0.136 g/1540.25 mm², the dimension of the extension portion of the inorganic dielectric layer in the thickness direction of the negative active material layer was 1/120 of the thickness of the main body portion; the weight of the lithium metal layer was 6.16 mg/1540.25 mm²; the weight ratio of the lithium metal layer per unit area to the inorganic dielectric layer per unit area was 30.8; and the average size G of the capillary channel in the thickness direction of the inorganic dielectric layer was 0.4 μm and the binding force $F_1$ between the lithium metal layer and the inorganic dielectric layer was 8 N/m.

Example 7

Example 1 was repeated with the exception that the coating weight of the positive electrode slurry was 0.204 g/1540.25 mm², the coating weight of the negative electrode slurry was 0.136 g/1540.25 mm²; the dimension of the extension portion of the inorganic dielectric layer in the thickness direction of the negative active material layer was 1/120 of the thickness of the main body portion; the weight of the lithium metal layer was 1.10 mg/1540.25 mm²; the weight ratio of the lithium metal layer per unit area to the inorganic dielectric layer per unit area was 5.5; and the average size G of the capillary channel in the thickness direction of the inorganic dielectric layer was 2.5 μm and the binding force $F_1$ between the lithium metal layer and the inorganic dielectric layer was 17 N/m.

Example 8

Example 1 was repeated with the exception that in the process for preparation of the inorganic dielectric layer, the process time was controlled to be 0.5 h; the thickness T of the main body portion of the inorganic dielectric layer was 30 nm, the dimension of the extension portion in the thickness direction of the negative active material layer was 1/1000 of the thickness of the main body portion; the weight ratio of the lithium metal layer per unit area to the inorganic dielectric layer per unit area was 101.7; and the average size G of the capillary channel in the thickness direction of the inorganic dielectric layer was 0.1 μm and the binding force $F_2$ between the inorganic dielectric layer and the negative electrode active material layer was 25 N/m.

Example 9

Example 1 was repeated with the exception that in the process for preparation of the inorganic dielectric layer, the process time was controlled to be 0.7 h; the thickness T of the main body portion of the inorganic dielectric layer was 100 nm, the dimension of the extension portion of the inorganic dielectric layer in the thickness direction of the negative active material layer was 1/500 of the thickness of the main body portion; the weight ratio of the lithium metal layer per unit area to the inorganic dielectric layer per unit area was 30.5; and the average size G of the capillary channel in the thickness direction of the inorganic dielectric layer was 1.0 μm and the binding force $F_2$ between the inorganic dielectric layer and the negative electrode active material layer was 30 N/m.

Example 10

Example 1 was repeated with the exception that in the process for preparation of the inorganic dielectric layer, the process time was controlled to be 1.5 h; the thickness T of the main body portion of the inorganic dielectric layer was 500 nm, the dimension of the extension portion of the inorganic dielectric layer in the thickness direction of the negative active material layer was 1/20 of the thickness of the main body portion; the weight ratio of the lithium metal layer per unit area to the inorganic dielectric layer per unit area was 6.1; and the binding force $F_2$ between the inorganic dielectric layer and the negative electrode active material layer was 40 N/m.

Example 11

Example 1 was repeated with the exception that in the process for preparation of the inorganic dielectric layer, the process time was controlled to be 2.5 h; the thickness T of the main body portion of the inorganic dielectric layer was 1000 nm, the dimension of the extension portion of the inorganic dielectric layer in the thickness direction of the negative active material layer was 1/10 of the thickness of the main body portion; the weight ratio of the lithium metal layer per unit area to the inorganic dielectric layer per unit area was 3.1; and the binding force $F_2$ between the inorganic dielectric layer and the negative electrode active material layer was 50 N/m.

Example 12

Example 1 was repeated with the exception that the window width during the manufacturing process was changed to be equal to the width of the electrode plate; the coverage ratio of the inorganic dielectric layer on the surface of the negative electrode active material layer was 100%; the weight ratio of the lithium metal layer per unit area to the inorganic dielectric layer per unit area was 19.1; and the binding force $F_2$ between the inorganic dielectric layer and the negative electrode active material layer was 37 N/m.

Example 13

Example 1 was repeated with the exception that the window width during the manufacturing process was changed to be equal to the width of the electrode plate; the surface of the negative electrode active material layer was covered with a mask, so that the main body of the obtained inorganic dielectric layer comprised a plurality of inorganic dielectric regions, and the plurality of inorganic dielectric regions each were independently disposed on the surface of the negative electrode active material layer at intervals; the coverage ratio of the inorganic dielectric layer on the surface of the negative electrode active material layer was 50%; the weight ratio of the lithium metal layer per unit area to the inorganic dielectric layer per unit area was 9.6; and the binding force $F_2$ between the inorganic dielectric layer and the negative electrode active material layer was 32 N/m.

Example 14

Example 1 was repeated with the exception that the window width during the manufacturing process was changed to be equal to the width of the electrode plate; the main body of the inorganic dielectric layer was a sheet-like body disposed on the surface of the negative electrode active material layer, and the sheet-like body was subjected to cold pressing treatment to have cracks penetratingly arranged along its thickness direction; the coverage of the inorganic dielectric layer on the surface of the negative electrode active material layer was 70%; the weight ratio of the lithium metal layer per unit area to the inorganic dielectric layer per unit area was 13.4.

Example 15

Example 1 was repeated with the exception that the window width during the manufacturing process was changed to be equal to the width of the electrode plate; the surface of the negative electrode active material layer was covered with a mask, so that the main body of the obtained inorganic dielectric layer comprised a plurality of inorganic dielectric regions, and the plurality of inorganic dielectric regions each were independently disposed on the surface of the negative electrode active material layer at intervals; the coverage ratio of the inorganic dielectric layer on the surface of the negative electrode active material layer was 90%; and the weight ratio of the lithium metal layer per unit area to the inorganic dielectric layer per unit area was 17.2.

Example 16

Example 1 was repeated with the exception that the window width during the manufacturing process was changed to be equal to the width of the electrode plate; the main body of the inorganic dielectric layer was a sheet-like body disposed on the surface of the negative electrode active material layer, and the sheet-like body was subjected to cold pressing treatment to have cracks penetratingly arranged along its thickness direction; the coverage ratio of the inorganic dielectric layer on the surface of the negative electrode active material layer was 80%; lithium powder was compounded on the surface of the inorganic dielectric layer facing away from the negative electrode active material layer by a roll pressing method to obtain a lithium metal layer, there was no above-mentioned capillary channels between the lithium metal layer and the inorganic dielectric layer; the binding force $F_2$ between the inorganic dielectric layer and the negative electrode active material layer was 35 N/m, and the binding force $F_1$ between the lithium metal layer and the inorganic dielectric layer was 7 N/m.

Example 17

Example 1 was repeated with the exception that in the process for preparation of the inorganic dielectric layer, the target material was metal titanium; the weight ratio of the lithium metal layer per unit area to the inorganic dielectric layer per unit area was 15; and the binding force $F_2$ between the inorganic dielectric layer and the negative electrode active material layer was 100 N/m.

Example 18

Example 1 was repeated with the exception that in the process for preparation of the inorganic dielectric layer, the target material was metal tin; the weight ratio of the lithium metal layer per unit area to the inorganic dielectric layer per unit area was 20; and the binding force $F_2$ between the inorganic dielectric layer and the negative electrode active material layer was 100 N/m.

Example 19

Example 1 was repeated with the exception that in the process for preparation of the inorganic dielectric layer, the target material was metal zinc; the weight ratio of the lithium metal layer per unit area to the inorganic dielectric layer per unit area was 16; and the binding force $F_2$ between the inorganic dielectric layer and the negative electrode active material layer was 100 N/m.

Comparative Example 1

Example 1 was repeated with the exception that no lithium metal layer was disposed.

Comparative Example 2

Example 1 was repeated with the exception that the coating weight of the negative electrode slurry was 0.094 g/1540.25 mm$^2$.

Comparative Example 3

Example 1 was repeated with the exception that the coating weight of the positive electrode slurry was 0.164 g/1540.25 mm², the coating weight of the negative electrode slurry is 0.136 g/1540.25 mm² and no lithium metal layer was disposed.

Comparative Example 4

Example 1 was repeated with the exception that the coating weight of the positive electrode slurry was 0.210 g/1540.25 mm², the coating weight of the negative electrode slurry was 0.136 g/1540.25 mm² and no lithium metal layer was disposed.

Comparative Example 5

Example 1 was repeated with the exception that the coating weight of the positive electrode slurry was 0.204 g/1540.25 mm², the coating weight of the negative electrode slurry was 0.136 g/1540.25 mm², the weight of the lithium metal layer was 1.99 mg/1540.25 mm²; and the weight ratio of the lithium metal layer per unit area to the inorganic dielectric layer per unit area was 10.0.

Comparative Example 6

Example 1 was repeated with the exception that no inorganic dielectric layer was disposed.

Testing (1) Tests of Normal Temperature Cycle Performance of Lithium-Ion Battery At 25° C., the lithium-ion battery was charged at a constant current of 1 C (that is, the current value at which the theoretical capacity is completely discharged within 1 h) to 4.2 V, and then charged at a constant voltage of 4.2 V until the current was 0.05 C. After that, the battery was left standing for 5 minutes, and then discharged at a constant current rate of 1 C to 2.8 V. The whole process was taken as one charge and discharge cycle. The discharge capacity for this cycle was the discharge capacity for the first cycle. The lithium-ion battery was subjected to multiple cycles of charge and discharge tests according to the above method, and the discharge capacity for each cycle was recorded until the discharge capacity of the lithium-ion battery decayed to 80% at which and the number of cycles of the lithium-ion battery was recorded.

(2) Tests of High Temperature Cycle Performance of Lithium-Ion Battery

At 60° C., the lithium-ion battery was charged at a constant current of 1 C to 4.2 V, and then charged at a constant voltage of 4.2 V until the current was 0.05 C. After that, the battery was left standing for 5 minutes, and then discharged at a constant current rate of 1 C to 2.8 V. The whole process was taken as one charge and discharge cycle. The discharge capacity for this cycle was the discharge capacity for the first cycle. The lithium-ion battery was subjected to 500 cycles of charge and discharge tests according to the above method, and the discharge capacity for the 500$^{th}$ cycle was recorded.

Capacity retention rate (%) of lithium-ion battery for 500 1 C/1 C cycles at 60° C.=(discharge capacity for the 500$^{th}$ cycle/discharge capacity for the 1$^{st}$ cycle)×100%.

(3) Tests of Storage Performance of Lithium-Ion Battery

At 25° C., the lithium-ion battery was charged at a constant current of 0.5 C (that is, the current value at which the theoretical capacity is completely discharged within 2 h) to 4.2 V, and then charged at a constant voltage of 4.2 V until the current was 0.05 C. After that, the battery was left standing for 5 minutes, and then discharged at a constant current rate of 0.5 C to 2.8 V. The discharge capacity for this process was the discharge capacity before storage. The lithium-ion battery was charged at a constant current of 0.5 C to 4.2 V, and then charged at a constant voltage of 4.2 V until the current was 0.05 C, and then set aside for 5 minutes, and then the fully charged lithium-ion battery was stored at 60° C. for 90 days. After that, the battery was removed and left standing at 25° C. for 2 h. The lithium-ion battery again was charged at a constant current of 0.5 C to 4.2 V, and then charged at a constant voltage of 4.2 V until the current was 0.05 C and then left standing for 5 minutes, and then discharged at a constant current rate of 0.5 C to 2.8 V. The discharge capacity for this process was the discharge capacity after storage at 60° C. for 90 days. Capacity retention ratio (%) of lithium-ion battery after storage at 60° C. for 90 days=(discharge capacity after storage at 60° C. for 90 days/discharge capacity before storage)×100%.

(4) Tests of DCR Growth Rate of Lithium-Ion Battery after Subjecting to High Temperature 500 Cycles and High Temperature Storage for 90 Days.

At 25° C., the lithium-ion battery was charged at a constant current of 1 C to 4.2 V and then charged at a constant voltage of 4.2 V until the current was 0.05 C, and afterwards left standing for 5 minutes, and finally discharged at a constant current rate of 1 C to 2.8 V. The actual discharge capacity was recorded. The stage of charge (SOC) of the lithium-ion battery was adjusted to 20% of the full charge capacity with the actual capacity. After adjustment, the voltage of the lithium-ion battery was measured and recorded as U1. Then, the battery was discharged with a rate of 0.3 C for 10 seconds, and the voltage of the lithium-ion battery after discharge was recorded as U2.

The initial direct current resistance of lithium-ion battery $DCR_0=(U1-U2)/1$.

According to the above method, the direct current internal resistance $DCR_1$ of lithium-ion battery after 500 cycles of 1 C/1 C at 60° C. was tested and then the DCR growth rate of the lithium-ion battery was calculated.

The DCR growth rate (%) of the lithium-ion battery after 500 cycles of 1 C/1 C at 60° C.=$(DCR_1-DCR_0)/DCR_0$×100%.

Similarly, the DC internal resistance $DCR_2$ of the lithium-ion battery stored at 60° C. for 90 days was tested according to the above method, and then the DCR growth rate of the lithium-ion battery was calculated.

The DCR growth rate (%) of the lithium-ion batteries stored at 60° C. for 90 days=$(DCR_2-DCR_0)/DCR_0$×100%.

(5) Tests of Lithium Precipitation on the Surface of Negative Electrode of the Lithium-Ion Battery under High-Current Charge At 25° C., the lithium-ion battery was charged at a constant current of 2 C that is the current value at which the theoretical capacity is completely discharged within 0.5 h to 4.2 V, and then charged at a constant voltage of 4.2 V until the current was 0.05 C, and then set aside for 5 minutes, and then discharged at a constant current rate of 2 C to 2.8 V, which was taken as one charge and discharge cycle. The lithium-ion battery was subjected to 10 cycles of high current charge and discharge according to the above method. After that, the lithium-ion battery was charged at a constant current of 2 C to 4.2 V, and then charged at a constant voltage of 4.2 V until the current was 0.05 C.

The fully charged battery was disassembled to take out the negative electrode plate. The negative electrode plate was observed for the state of lithium precipitation to determine the degree of lithium precipitation based on the following rating: A. no lithium precipitation; B. slight lithium precipitation; C. lithium formation in local area; D. lithium remains in most areas; E. severe lithium precipitation.

The test results of Examples 1 to 19 and Comparative Examples 1 to 6 were shown in Table 2 below.

TABLE 1

| | Weight ratio of lithium metal layer per unit area to negative active layer material per unit area (%) | Capacity of Negative electrode per unit area (mAh) | Capacity of Positive electrode per unit area (mAh) | CB value | CBL value |
|---|---|---|---|---|---|
| Ex. 1 | 2.54 | 38.76 | 25.90 | 1.50 | 1.10 |
| Ex. 2 | 1.46 | 33.59 | 25.90 | 1.30 | 1.10 |
| Ex. 3 | 2.54 | 43.93 | 29.29 | 1.50 | 1.10 |
| Ex. 4 | 1.46 | 43.93 | 33.76 | 1.30 | 1.10 |
| Ex. 5 | 4.00 | 43.93 | 23.04 | 1.90 | 1.10 |
| Ex. 6 | 4.53 | 43.93 | 20.90 | 2.10 | 1.10 |
| Ex. 7 | 0.81 | 43.93 | 36.43 | 1.20 | 1.10 |
| Ex. 8 | 2.54 | 38.76 | 25.90 | 1.50 | 1.10 |
| Ex. 9 | 2.54 | 38.76 | 25.90 | 1.50 | 1.10 |
| Ex. 10 | 2.54 | 38.76 | 25.90 | 1.50 | 1.10 |
| Ex. 11 | 2.54 | 38.76 | 25.90 | 1.50 | 1.10 |
| Ex. 12 | 2.54 | 38.76 | 25.90 | 1.50 | 1.10 |
| Ex. 13 | 2.54 | 38.76 | 25.90 | 1.50 | 1.10 |
| Ex. 14 | 2.54 | 38.76 | 25.90 | 1.50 | 1.10 |
| Ex. 15 | 2.54 | 38.76 | 25.90 | 1.50 | 1.10 |
| Ex. 16 | 2.54 | 38.76 | 25.90 | 1.50 | 1.10 |
| Ex. 17 | 2.54 | 38.76 | 25.90 | 1.50 | 1.10 |
| Ex. 18 | 2.54 | 38.76 | 25.90 | 1.50 | 1.10 |
| Ex. 19 | 2.54 | 38.76 | 25.90 | 1.50 | 1.10 |
| CEx. 1 | / | 38.36 | 25.90 | 1.50 | 1.50 |
| CEx. 2 | 3.24 | 30.36 | 25.90 | 1.17 | 0.86 |
| CEx. 3 | / | 43.93 | 29.29 | 1.50 | 1.50 |
| CEx. 4 | / | 43.93 | 37.51 | 1.17 | 1.17 |
| CEx. 5 | 1.46 | 43.93 | 36.43 | 1.20 | 1.03 |
| CEx. 6 | 2.54 | 38.76 | 25.90 | 1.50 | 1.10 |

TABLE 2

| | Normal temperature cycle number until Capacity retention rate decays to 80% | Capacity retention rate at 60° C. for 500 cycles (%) | DCR growth rate (%) for 500 cycles at 60° C. (%) | Capacity retention rate stored at 60° C. for 90 days (%) | DCR growth rate (%) stored at 60° C. for 90 days (%) | Lithium precipitation on the surface of negative electrode under high-current charge |
|---|---|---|---|---|---|---|
| Ex. 1 | 2200 | 95.70 | 15.42 | 95.14 | 13.90 | A |
| Ex. 2 | 2000 | 95.44 | 15.68 | 94.67 | 14.17 | A |
| Ex. 3 | 2300 | 96.13 | 14.99 | 95.18 | 13.46 | A |
| Ex. 4 | 2000 | 95.64 | 15.48 | 94.47 | 13.97 | A |
| Ex. 5 | 2400 | 96.50 | 14.62 | 95.15 | 13.09 | A |
| Ex. 6 | 2400 | 96.60 | 14.52 | 95.05 | 12.99 | A |
| Ex. 7 | 2000 | 91.61 | 19.51 | 89.71 | 18.13 | A |
| Ex. 8 | 2200 | 96.40 | 14.72 | 94.44 | 13.20 | A |
| Ex. 9 | 2000 | 91.81 | 19.31 | 89.51 | 17.93 | A |
| Ex. 10 | 1900 | 91.48 | 19.65 | 88.96 | 18.28 | C |
| Ex. 11 | 1850 | 89.20 | 21.93 | 86.41 | 20.63 | D |
| Ex. 12 | 1800 | 86.91 | 24.21 | 83.86 | 22.98 | A |
| Ex. 13 | 2200 | 96.90 | 14.22 | 93.94 | 12.70 | A |
| Ex. 14 | 2200 | 97.00 | 14.12 | 93.84 | 12.60 | A |
| Ex. 15 | 2100 | 92.75 | 18.37 | 89.26 | 16.98 | A |
| Ex. 16 | 2100 | 93.23 | 19.11 | 90.11 | 15.55 | A |
| Ex. 17 | 2100 | 94.33 | 17.54 | 92.11 | 14.55 | A |
| Ex. 18 | 2100 | 96.32 | 14.55 | 94.21 | 12.22 | A |
| Ex. 19 | 2100 | 94.31 | 25.21 | 92.46 | 16.43 | A |
| CEx. 1 | 1100 | 78.52 | 32.60 | 74.40 | 40.87 | A |
| CEx. 2 | 1100 | 86.32 | 24.81 | 82.22 | 32.85 | B |
| CEx. 3 | 1050 | 82.57 | 28.55 | 78.16 | 36.71 | A |
| CEx. 4 | 1050 | 82.67 | 28.45 | 78.06 | 36.61 | A |
| CEx. 5 | 1050 | 82.77 | 28.35 | 77.96 | 36.51 | A |
| CEx. 6 | 1000 | 79.02 | 32.10 | 73.90 | 40.37 | A |

By comparison of Examples 1 to 19 and Comparative Examples 1, 3, 4 and 6, it can be seen that by disposing the above-mentioned inorganic dielectric layer and lithium metal layer on the negative electrode plate, the cycle life of the lithium ion secondary battery could be significantly improved, and the requirements of long-life electric buses and large-scale energy storage systems could be met. In addition, it was also possible to reduce the growth rate of the DC resistance of the lithium-ion secondary battery during high-temperature cycle and high-temperature storage, which was conducive to improving the performance of batteries.

By comparison of Examples 1 to 19 and Comparative Examples 2, 4 and 5, it can be seen that the ratio of the negative electrode capacity C1 per unit area to the positive electrode capacity C2 per unit area being from 1.2 to 2.1, and the negative electrode capacity per unit area C1, the positive electrode capacity per unit area C2 and the lithium metal layer capacity per unit area C3 satisfying the relationship of C1/(C2+C3×K)≥1.05, are beneficial to improving the cycle life of lithium-ion secondary batteries and reducing the growth rate of DC resistance of lithium-ion secondary batteries during high-temperature cycling and high-temperature storage, thereby improving battery performance.

Comparative Example 2-1

Example 1 was repeated with the exception that the negative electrode plate was not provided with an inorganic dielectric layer; the negative electrode active material was alumina-coated artificial graphite and the negative electrode plate was prepared by the following steps: the negative electrode active material, a conductive agent acetylene black, a binder SBR and a thickener CMC-Na were dispersed in solvent deionized water, stirred and mixed uniformly to obtain a negative electrode slurry, wherein the weight ratio of the artificial graphite, acetylene black, SBR and CMC-Na were 95:1.5:3.1:0.4; the weight ratio of the lithium metal layer per unit area to alumina in the negative electrode active material layer per unit area was 15.3. The reversible gram capacity of alumina-coated artificial graphite was 310 mAh/g.

Comparative Example 2-2

Example 17 was repeated with the exception that the negative electrode plate was not provided with an inorganic dielectric layer; the negative electrode active material was titanium oxide-coated artificial graphite and the negative electrode plate was prepared by the following steps: the negative electrode active material, a conductive agent acetylene black, a binder SBR and a thickener CMC-Na were dispersed in solvent deionized water, stirred and mixed uniformly to obtain a negative electrode slurry, wherein the weight ratio of the artificial graphite, acetylene black, SBR and CMC-Na were 95:1.5:3.1:0.4; the weight ratio of the lithium metal layer per unit area to alumina in the negative electrode active material layer per unit area was 15. The reversible gram capacity of alumina-coated artificial graphite was 300 mAh/g.

Comparative Example 2-3

Example 18 was repeated with the exception that the negative electrode plate was not provided with an inorganic dielectric layer; the negative electrode active material was tin oxide-coated artificial graphite and the negative electrode plate was prepared by the following steps: the negative electrode active material, a conductive agent acetylene black, a binder SBR and a thickener CMC-Na were dispersed in solvent deionized water, stirred and mixed uniformly to obtain a negative electrode slurry, wherein the weight ratio of the artificial graphite, acetylene black, SBR and CMC-Na were 95:1.5:3.1:0.4; the weight ratio of the lithium metal layer per unit area to tin oxide in the negative electrode active material layer per unit area was 20. The reversible gram capacity of tin oxide-coated artificial graphite was 320 mAh/g.

Comparative Example 2-4

Example 19 was repeated with the exception that the negative electrode plate was not provided with an inorganic dielectric layer; the negative electrode active material was zinc oxide-coated artificial graphite and the negative electrode plate was prepared by the following steps: the negative electrode active material, a conductive agent acetylene black, a binder SBR and a thickener CMC-Na were dispersed in solvent deionized water, stirred and mixed uniformly to obtain a negative electrode slurry, wherein the weight ratio of the artificial graphite, acetylene black, SBR and CMC-Na were 95:1.5:3.1:0.4; the weight ratio of the lithium metal layer per unit area to alumina in the negative electrode active material layer per unit area was 16. The reversible gram capacity of alumina-coated artificial graphite was 320 mAh/g.

TABLE 3

| | Capacity of Negative electrode per unit area (mAh) | Capacity of Positive electrode per unit area (mAh) | CB value | CBL value |
|---|---|---|---|---|
| Ex. 1 | 38.76 | 25.90 | 1.50 | 1.10 |
| CEx. 2-1 | 34.33 | 25.90 | 1.32 | 1.07 |
| Ex. 17 | 38.76 | 25.90 | 1.50 | 1.10 |
| CEx. 2-2 | 36.54 | 25.90 | 1.41 | 1.09 |
| Ex. 18 | 38.76 | 25.90 | 1.50 | 1.10 |
| CEx. 2-3 | 35.44 | 25.90 | 1.37 | 1.08 |
| Ex. 19 | 38.76 | 25.90 | 1.50 | 1.10 |
| CEx. 2-4 | 35.44 | 25.90 | 1.37 | 1.08 |

TABLE 4

| | Cycle number until Capacity retention rate decays to 80% at normal temperature | Capacity retention rate at 60° C. for 500 cycles (%) | DCR growth rate for 500 cycles at 60° C. (%) | Capacity retention rate stored at 60° C. for 90 days (%) | DCR growth rate stored at 60° C. for 90 days (%) | Lithium precipitation on the surface of negative electrode under high-current charge |
|---|---|---|---|---|---|---|
| Ex. 1 | 2200 | 95.70 | 15.42 | 95.14 | 13.90 | A |
| CEx. 2-1 | 1200 | 87.11 | 35.31 | 86.43 | 26.65 | A |
| Ex. 17 | 2100 | 94.33 | 17.54 | 92.11 | 14.55 | A |
| CEx. 2-2 | 1300 | 88.39 | 31.56 | 88.74 | 22.31 | A |

TABLE 4-continued

|  | Cycle number until Capacity retention rate decays to 80% at normal temperature | Capacity retention rate at 60° C. for 500 cycles (%) | DCR growth rate for 500 cycles at 60° C. (%) | Capacity retention rate stored at 60° C. for 90 days (%) | DCR growth rate stored at 60° C. for 90 days (%) | Lithium precipitation on the surface of negative electrode under high-current charge |
|---|---|---|---|---|---|---|
| Ex. 18 | 2100 | 96.32 | 14.55 | 94.21 | 12.22 | A |
| CEx. 2-3 | 1200 | 89.58 | 36.12 | 85.12 | 24.56 | A |
| Ex. 19 | 2100 | 94.31 | 25.21 | 92.46 | 16.43 | A |
| CEx. 2-4 | 1200 | 88.39 | 33.11 | 82.95 | 29.31 | A |

The test in Table 4 was the same as the test method described above.

After the lithium-ion batteries of Examples 1, 17, 18, and 19 were subjected to charging and discharging at high temperature for 500 cycles and being stored at high temperature for 90 days, respectively, the batteries were disassembled and analyzed. It was found that the inorganic dielectric layer of the negative electrode plate and the side reaction products on the negative electrode interface side were merged to a higher degree, in which the thickness of the inorganic dielectric layer was not measurable, and a part of the inorganic dielectric material penetrated into the negative electrode active material layer under the action of the potential difference. From the test results of Examples 1, 17, 18, 19 and Comparative Examples 2-1 to 2-4, it can be seen that, compared with the negative active material with a surface coating in the Comparative Examples, the inorganic dielectric material of the embodiments of the present application after entering the negative active material layer produced the results that the DC resistance growth rate of the batteries was significantly smaller, and the cycle capacity retention rate of the batteries was significantly higher. This was because the negative active material layer had formed a continuous conductive network, and the inorganic dielectric material entering the negative active material layer could also enable the negative electrode to have respectively high lithium ion and electron transport performances, thereby increasing the cycle life of the batteries. Below are some exemplary embodiments of the present application.

Embodiment 1. A negative electrode plate, comprising
a negative electrode current collector;
a negative electrode active material layer disposed on the negative electrode current collector;
a binder-free inorganic dielectric layer disposed on one side of the negative electrode active material layer away from the negative electrode current collector, the inorganic dielectric layer comprising an inorganic dielectric material, and the inorganic dielectric layer including at least a main body portion disposed on the surface of the negative electrode active material layer, the main body portion having a thickness of from 30 nm to 1000 nm; and
a lithium metal layer disposed on the surface of the inorganic dielectric layer away from the negative electrode active material layer.

Embodiment 2. The negative electrode plate as claimed in Embodiment 1, wherein
in the negative electrode plate per 2 cm×2 cm unit area, a weight ratio of the lithium metal layer to the inorganic dielectric layer is from 2:1 to 200:1; and/or
in the negative electrode plate per 2 cm×2 cm unit area, a weight ratio of the lithium metal layer to the negative electrode active material layer is from 0.5% to 5%.

Embodiment 3. The negative electrode plate as claimed in Embodiment 1 or 2, wherein a coverage ratio of the inorganic dielectric layer on the surface of the negative electrode active material layer δ is in a range of 50% to 100%.

Embodiment 4. The negative electrode plate as claimed in any one of Embodiments 1 to 3, wherein the main body portion comprises a plurality of inorganic dielectric regions, and the plurality of inorganic dielectric regions are disposed on the surface of the negative electrode active material layer and adjacent inorganic dielectric regions are spaced apart from each other; or
the main body portion is a sheet-shaped body provided on the surface of the negative active material layer, and the sheet-shaped body has an opening penetratingly arranged along a thickness direction of the main body portion.

Embodiment 5. The negative electrode plate as claimed in any one of Embodiments 1 to 4, wherein the inorganic dielectric layer further comprises an extension portion connected with the surface of the main body portion facing toward the negative active material layer, the extension portion extending along the wall surface of pores in the negative electrode active material layer away from the main body portion and covering the wall surface of pores in the form of a thin film,
the dimension of the extension portion in a thickness direction of the negative electrode active material layer to the thickness of the main body portion has a ratio of 1/1000 to 1/10.

Embodiment 6. The negative electrode plate as claimed in any one of Embodiments 1 to 5, wherein the inorganic dielectric material has an ion conductivity.

Embodiment 7. The negative electrode plate as claimed in any one of Embodiments 1 to 6, wherein
the inorganic dielectric material comprises one or more of oxides of element A, nitrides of element A, and halides of element A, the halides of element A preferably being fluoride of element A, where element A is one or more of Al, Si, Ti, Zn, Mg, Zr, Ca, and Ba; and/or
the inorganic dielectric material has an average particle size $D_v50$ of 1 nm to 100 nm.

Embodiment 8. The negative electrode plate as claimed in any one of Embodiments 1 to 7, wherein the inorganic dielectric layer is an inorganic dielectric layer disposed on the surface of the negative electrode active material layer by a vapor deposition method.

Embodiment 9. The negative electrode plate as claimed in any one of Embodiments 1 to 8, wherein a surface of the inorganic dielectric layer away from the negative active material layer is an uneven surface to form a capillary channel for electrolyte infiltration between the lithium metal layer and the inorganic dielectric layer;

preferably, the capillary channels has an average size G of 0 μm<G 0 sm in the thickness direction of the inorganic dielectric layer.

Embodiment 10. The negative electrode plate as claimed in any one of Embodiments 1 to 9, wherein a binding force between the lithium metal layer and the inorganic dielectric layer is $F_1$, a binding force between the inorganic dielectric layer and the negative active material layer is $F_2$, and $F_1$ and $F_2$ satisfy: $0<F_1<F_2$, preferably, $F_1$ and $F_2$ satisfy: $F_1 \leq 0.8 \times F_2$.

Embodiment 11. The negative electrode plate as claimed in any one of Embodiments 1 to 10, wherein the negative electrode plate has a compacted density of 1.2 g/cm$^3$~2.0 g/cm$^3$; and/or, the negative electrode plate has a porosity of 25%-60%.

Embodiment 12. The negative electrode plate as claimed in any one of Embodiments 1 to 11, wherein the negative electrode active material layer comprises a negative electrode active material, that is one or more selected from natural graphite, artificial graphite, soft carbon, hard carbon, mesocarbon microspheres, nano carbon, elemental silicon, silicon oxygen compound, silicon-carbon composite, silicon alloy, elemental tin, tin-oxygen compounds, tin-carbon composites, tin alloys, and lithium titanate.

Embodiment 13. A negative electrode plate, comprising
a negative electrode current collector;
a negative electrode active material layer disposed on the negative electrode current collector comprising a pre-intercalated negative electrode active material;
a binder-free inorganic dielectric layer disposed on one side of the negative electrode active material layer away from the negative electrode current collector, the inorganic dielectric layer comprising an inorganic dielectric material, and the inorganic dielectric layer including at least a main body portion disposed on the surface of the negative electrode active material layer, the main body portion having a thickness of from 30 nm to 1000 nm.

Embodiment 14. An electrode assembly, comprising a positive electrode plate, a negative electrode plate and a separator, wherein the negative electrode plate is the negative electrode plate according to any one of Embodiments 1 to 13.

Embodiment 15. An electrode assembly, including a positive electrode plate, a negative electrode plate, and a separator, wherein the negative electrode plate is the negative electrode plate according to any one of Embodiments 1 to 12;
wherein in the negative electrode plate per unit area of 2 cm×2 cm, a weight ratio of the lithium metal layer to the negative electrode active material layer is 0.5%~5%; wherein a ratio of a capacity C1 of negative electrode per unit area to a capacity C2 of positive electrode per unit area is 1.~2.1; and
wherein the capacity C1 of negative electrode per unit area, the capacity C2 of positive electrode per unit area and a capacity C3 of lithium metal layer per unit area satisfy C1/(C2+C3×K)≥1.05, where K is a utilization rate of metal lithium in the lithium metal layer.

Embodiment 16. A lithium-ion battery, comprising an electrode assembly and an electrolyte, wherein the electrode assembly adopts the battery cell according to Embodiment 14 or 15.

Embodiment 17. An apparatus, comprising the lithium-ion battery of Embodiment 16.

Embodiment 18. A process for preparing a lithium-ion battery, comprising preparing a negative electrode plate of the lithium-ion battery by
disposing a negative electrode active material layer on at least one surface of a negative electrode current collector;
depositing an inorganic dielectric material on one side of the negative electrode active material layer away from the negative electrode current collector to form a binder-free inorganic dielectric layer, the inorganic dielectric layer comprising at least a main body portion disposed on the surface of the negative electrode active material layer, the main body portion having a thickness of from 30 nm to 1000 nm; and
disposing a lithium metal layer on the surface of the inorganic dielectric layer away from the negative electrode active material layer to obtain the negative electrode plate.

The above describes merely specific embodiments of the present application, but is not intended to limit the protection scope of the present application. Various equivalent variations or replacements obtained by those skilled in the related art within the scope of present application shall fall within the protection scope of the present application. Therefore, the protection scope of the present application shall be defined by the claims.

What is claimed is:
1. A lithium-ion battery, comprising an electrode assembly and an electrolyte, wherein the electrode assembly is an electrode assembly including a positive electrode plate, a negative electrode plate, and a separator, wherein the negative electrode plate is a negative electrode plate (10), comprising
a negative electrode current collector (11);
a negative electrode active material layer (12) disposed on the negative electrode current collector (11);
a binder-free inorganic dielectric layer (13) disposed on one side of the negative electrode active material layer (12) away from the negative electrode current collector (11), the inorganic dielectric layer (13) comprising an inorganic dielectric material, and the inorganic dielectric layer (13) including at least a main body portion (131) disposed on the surface of the negative electrode active material layer (12), the main body portion (131) having a thickness of from 30 nm to 200 nm; and
a lithium metal layer (14) disposed on the surface of the inorganic dielectric layer (13) away from the negative electrode active material layer (12),
the inorganic dielectric layer (13) further comprises an extension portion (134) connected with the surface of the main body portion (131) facing toward the negative active material layer (132), the extension portion (134) extending along a wall surface of pores in the negative electrode active material layer (12) away from the main body portion (131) and covering the wall surface of pores in a form of a thin film,
the dimension of the extension portion (134) in a thickness direction of the negative electrode active material layer (12) to the thickness of the main body portion (131) has a ratio of 1/1000 to 1/80;
the inorganic dielectric material comprises oxides of Al;
the negative electrode current collector is a copper foil; and
the negative electrode active material layer (12) comprises a negative electrode active material, that is artificial graphite, wherein in the negative electrode plate per unit area of 2 cm×2 cm, a weight ratio of the lithium metal layer to the negative electrode active material layer is 0.5%~5%;

wherein a ratio of a capacity C1 of negative electrode per unit area to a capacity C2 of positive electrode per unit area is 1.2~2.1; and wherein the capacity C1 of negative electrode per unit area, the capacity C2 of positive electrode per unit area and a capacity C3 of lithium metal layer per unit area satisfy C1/(C2+C3×K)≥1.05, where K is a utilization rate of metal lithium in the lithium metal layer.

2. The lithium-ion battery as claimed in claim 1, wherein in the negative electrode plate (10) per 2 cm×2 cm unit area, a weight ratio of the lithium metal layer (14) to the inorganic dielectric layer (13) is from 2:1 to 200:1.

3. The lithium-ion battery as claimed in claim 1, wherein a coverage ratio of the inorganic dielectric layer (13) on the surface of the negative electrode active material layer (12) δ is in a range of 50% to 100%.

4. The lithium-ion battery as claimed in claim 1, wherein the main body portion (131) comprises a plurality of inorganic dielectric regions, and the plurality of inorganic dielectric regions are disposed on the surface of the negative electrode active material layer (12) and adjacent inorganic dielectric regions are spaced apart from each other; or the main body portion (131) is a sheet-shaped body provided on the surface of the negative active material layer, and the sheet-shaped body has an opening penetratingly arranged along a thickness direction of the main body portion (131).

5. The lithium-ion battery as claimed in claim 1, wherein the inorganic dielectric material has an ion conductivity.

6. The lithium-ion battery as claimed in claim 1, wherein the inorganic dielectric material has an average particle size $D_v50$ of 1 nm to 100 nm.

7. The lithium-ion battery as claimed in claim 1, wherein the inorganic dielectric layer (13) is an inorganic dielectric layer disposed on the surface of the negative electrode active material layer, which is obtained by a vapor deposition method.

8. The lithium-ion battery as claimed in claim 1, wherein a surface of the inorganic dielectric layer (13) away from the negative active material layer (12) is an uneven surface to form a capillary channel for electrolyte infiltration between the lithium metal layer and the inorganic dielectric layer.

9. The lithium-ion battery as claimed in claim 1, wherein a binding force between the lithium metal layer (14) and the inorganic dielectric layer (13) is $F_1$, a binding force between the inorganic dielectric layer (13) and the negative active material layer (12) is $F_2$, and $F_1$ and $F_2$ satisfy: $0<F_1<F_2$.

10. The lithium-ion battery as claimed in claim 1, wherein the negative electrode plate (10) has a compacted density of 1.2 g/cm$^3$~2.0 g/cm$^3$; and/or, the negative electrode plate (10) has a porosity of 25%-60%.

11. The lithium-ion battery as claimed in claim 8, wherein the capillary channel has an average size G of 0 μm<G≤3 μm in the thickness direction of the inorganic dielectric layer.

12. The lithium-ion battery as claimed in claim 9, wherein $F_1$ and $F_2$ satisfy: $F_1 \leq 0.8 \times F_2$.

* * * * *